United States Patent
Andes et al.

(10) Patent No.: US 9,645,396 B2
(45) Date of Patent: May 9, 2017

(54) PERIPHERAL VISION HEAD-MOUNTED DISPLAY FOR IMPARTING INFORMATION TO A USER WITHOUT DISTRACTION AND ASSOCIATED METHODS

(71) Applicant: 4iiii Innovations Inc., Calgary (CA)

(72) Inventors: Ian Edward Andes, Los Angeles, CA (US); Kipling William Fyfe, Cochrane (CA); Jacob P. McEvoy, Calgary (CA)

(73) Assignee: 4iiii Innovations Inc., Cochrane, Alberta (CA)

( * ) Notice: Subject to any disclaimer, the term of this patent is extended or adjusted under 35 U.S.C. 154(b) by 0 days.

(21) Appl. No.: 13/848,650

(22) Filed: Mar. 21, 2013

(65) Prior Publication Data

US 2013/0214998 A1 Aug. 22, 2013

Related U.S. Application Data

(63) Continuation of application No. PCT/US2011/052641, filed on Sep. 21, 2011.

(60) Provisional application No. 61/385,057, filed on Sep. 21, 2010.

(51) Int. Cl.
G09G 5/00 (2006.01)
G02B 27/01 (2006.01)

(52) U.S. Cl.
CPC ....... *G02B 27/0172* (2013.01); *G02B 27/017* (2013.01); *G02B 2027/0178* (2013.01)

(58) Field of Classification Search
CPC .......... G02B 27/017; G02B 2027/0178; G02B 27/0172; G09G 3/02; A63B 2024/009; A63B 2071/0625; A63B 2071/0636

USPC ..... 345/8, 7; 348/E13.074, E13.075, 46, 51; 359/630; 340/340, 529.13
See application file for complete search history.

(56) References Cited

U.S. PATENT DOCUMENTS

| | | | | |
|---|---|---|---|---|
| 4,028,725 | A * | 6/1977 | Lewis | 348/115 |
| 5,162,828 | A * | 11/1992 | Furness et al. | 353/122 |
| 6,539,336 | B1 | 3/2003 | Vock et al. | |
| 6,825,777 | B2 | 11/2004 | Vock et al. | |
| 7,245,216 | B2 * | 7/2007 | Burkley et al. | 340/539.13 |
| 7,542,012 | B2 * | 6/2009 | Kato et al. | 345/8 |
| 7,719,769 | B2 * | 5/2010 | Sugihara et al. | 359/630 |
| 7,856,339 | B2 | 12/2010 | Vock et al. | |
| 8,396,687 | B2 | 3/2013 | Vock et al. | |
| 8,531,355 | B2 * | 9/2013 | Maltz | 345/8 |
| 8,620,600 | B2 * | 12/2013 | Vock et al. | 702/44 |

(Continued)

OTHER PUBLICATIONS

PCT/US2011/052641 International Search Report and Written Opinion mailed Feb. 7, 2013; 9 pages.

(Continued)

*Primary Examiner* — Peter D McCloone
(74) *Attorney, Agent, or Firm* — Lathrop & Gage LLP

(57) ABSTRACT

A head-mounted peripheral vision display and associated methods display information to a user without distraction. A plurality of light display elements are positioned within an area of peripheral vision of at least one eye of the user such that the information is imparted to the user without a need for repositioning or refocusing of the eye. The information may be determined from data received from one or more sensors and an illumination pattern is determined based upon the performance information. The light display elements are controlled to display the illumination pattern to the user.

18 Claims, 17 Drawing Sheets

(56) References Cited

U.S. PATENT DOCUMENTS

| | | | |
|---|---|---|---|
| 8,705,177 B1* | 4/2014 | Miao | 359/630 |
| 8,786,675 B2* | 7/2014 | Deering | 348/46 |
| 8,878,749 B1* | 11/2014 | Wu et al. | 345/8 |
| 8,941,559 B2* | 1/2015 | Bar-Zeev et al. | 345/7 |
| 2005/0219152 A1* | 10/2005 | Budd | G02B 27/0172 345/8 |
| 2006/0119539 A1* | 6/2006 | Kato et al. | 345/8 |
| 2006/0158329 A1* | 7/2006 | Burkley et al. | 340/539.13 |
| 2006/0221266 A1* | 10/2006 | Kato et al. | 348/838 |
| 2007/0195012 A1* | 8/2007 | Ichikawa | G02B 27/017 345/8 |
| 2009/0189974 A1 | 7/2009 | Deering | |
| 2010/0035726 A1 | 2/2010 | Fisher et al. | |
| 2010/0149073 A1 | 6/2010 | Chaum et al. | |
| 2012/0021806 A1* | 1/2012 | Maltz | 455/566 |
| 2012/0068913 A1* | 3/2012 | Bar-Zeev et al. | 345/8 |
| 2013/0249776 A1* | 9/2013 | Olsson et al. | 345/8 |
| 2014/0123015 A1* | 5/2014 | Sako et al. | 715/720 |
| 2014/0146394 A1* | 5/2014 | Tout et al. | 359/630 |
| 2014/0313585 A1* | 10/2014 | Jarvenpaa | 359/630 |
| 2015/0015461 A1* | 1/2015 | Morimoto | 345/8 |

OTHER PUBLICATIONS

PCT/US2011/052641 Response to Written Opinion dated Jun. 1, 2012; 9 pages.

* cited by examiner

PERIPHERAL VISION HEAD-MOUNTED DISPLAY FOR IMPARTING INFORMATION TO A USER WITHOUT DISTRACTION AND ASSOCIATED METHODS

RELATED APPLICATIONS

This application is a continuation of International Application No. PCT/US2011/052641 filed Sep. 21, 2011, which claims priority to U.S. Provisional Patent Application Ser. No. 61/385,057, filed Sep. 21, 2010. Both of the aforementioned applications are incorporated herein by reference.

FIELD OF THE INVENTION

The present disclosure is directed to a headset that presents information through visual and audible means with minimal impact on user focus and attention toward user activity.

BACKGROUND

Fitness and activity monitors typically take the form of a small display device that is worn as a wristwatch or, in the case of a bicycle computer, motorbike, or snowmobile speedometer, mounted to the handlebars of the vehicle. Performance metrics such as heart rate, speed, distance, location, cadence, power, among others, are measured by one or more sensors connected to the display device either electrically or through a wireless communication link. The display device typically receives, processes, and displays the performance information to the user.

Such activity monitors and feedback mechanisms may present several issues to the user. First, since the display device must be lightweight and portable, the display size is typically small and difficult to read while in motion, a situation that is worsened in low light conditions. In certain sports, such as swimming, it is not feasible for the user to read a display without significantly interfering with the activity. Second, the user must frequently take focus off of his activity to read displayed information, which can be distracting or dangerous to the activity at hand. Competitive athletes can find such a lack of focus detrimental to optimal performance and safety. Certain activities such as cycling, motorcycling, and snowmobiling require constant attention to the road, trail, and surrounding environment; looking elsewhere can lead to injury. Third, the reading and operation of a wrist-worn or handlebar-mounted display can interfere with efficient body motions required for optimal performance. Frequent viewing of a wristwatch, or operation of the wristwatch by the opposite hand, for example, can interfere with the efficient arm and corresponding stride motion during running activity. As another example, the viewing or operation of a bicycle computer can cause the cyclist to exit from a streamlined aerodynamic position, which is detrimental to his resultant performance.

Heads-Up displays, as well known in the art, present a focused image (e.g., alphanumeric characters and/or graphics) to a wearer of the display. The focused image is projected into at least part of the wearer's normal operational field of view, such that the user typically sees the focused image overlaid onto that normal field of view. While allowing the user to assimilate the information from the focused display, this information is also distracting since this focused image partially covers the wearer's operational field of view, that part of the wearer's normal field of view is obscured.

SUMMARY

In one embodiment, a head-mounted display displays information to a user without distraction. At least one light display element is positioned within a peripheral vision area of at least one eye of the user such that the information is imparted to the user without the need of repositioning or refocusing the eye. A receiver receives the information and a microcontroller, coupled with the receiver and the at least one light display element, processes the information to determine an illumination pattern based upon the information and controls the at least one light display element to display the illumination pattern.

In another embodiment, a method displays information to a user without distraction. The information is received within a microcontroller of a peripheral vision display system. An illumination pattern for at least one light display element is determined, based upon the information, within the microcontroller and the at least one light display element is controlled to display the illumination pattern. The at least one light display element is positioned within an area of peripheral vision of at least one eye of the user such that the information may be imparted to the user without the need to reposition or refocus the eye.

In another embodiment, a headset displays information within a peripheral vision area of a user. The headset includes a receiver for receiving a signal from a signaling device, at least one light display element positioned within a peripheral vision area of at least one eye of the user such that the information is imparted to the user without the need of repositioning or refocusing the eye, and a microcontroller coupled with the receiver and the light display element for determining an illumination pattern based upon the signal and for controlling the light display elements to display the illumination pattern.

In another embodiment, a system displays audio information within a peripheral vision area of a user. The system includes at least one microphone for detecting sound, at least one light display element positioned within a peripheral vision area of at least one eye of the user such that the information is imparted to the user without the need of repositioning or refocusing the eye, and a microcontroller coupled with the at least one microphone and the at least one light display element. The system includes machine readable instructions that, when executed by the microcontroller, perform the steps of: processing the detected sound to generate the audio information, generating an illumination pattern based upon the detected sound, and controlling the at least one light display element to display the illumination pattern.

In another embodiment, headwear displays information within a peripheral vision area of a user. A receiver is integrated with the headwear and receives the information. At least one light display element is integrated with the headwear and positioned within a peripheral vision area of at least one eye of the user. A microcontroller is integrated with the headwear and coupled with the receiver and the light display element. The microcontroller determines an illumination pattern based upon the signal and controls the light display elements to display the illumination pattern. The information is imparted to the user without the need of repositioning or refocusing the eye.

DETAILED DESCRIPTION

Figure 1:
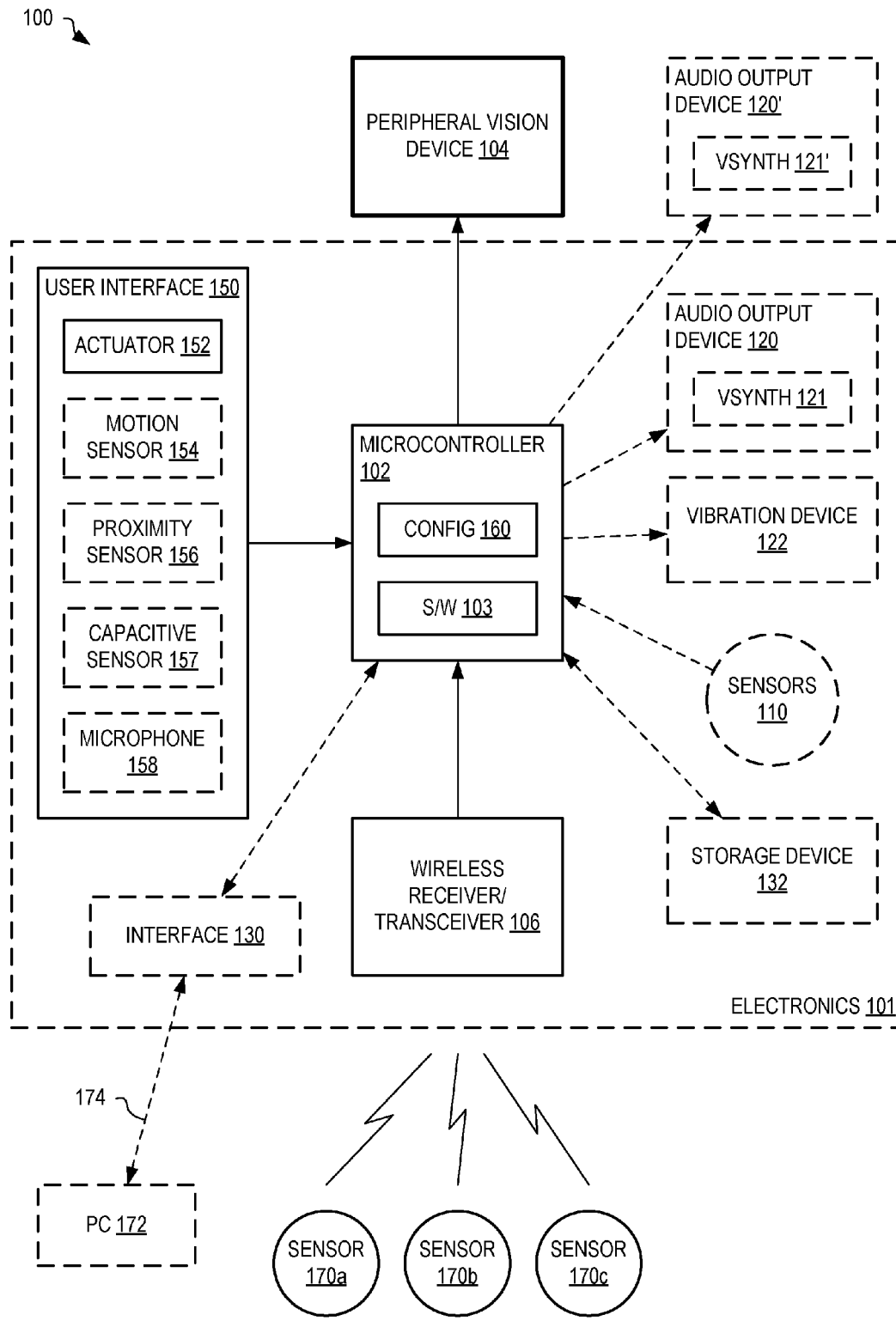
FIG. 1 shows a schematic view of one exemplary head-mounted system for displaying performance information, in an embodiment.

FIG. 1 schematically shows one exemplary head-mounted performance display system 100 for displaying performance information within a peripheral vision area of a user. System 100 includes a microcontroller 102, a peripheral vision device 104, and a wireless receiver/transceiver 106. Microcontroller 102 may include memory (non-volatile and volatile), one or more analog to digital converters, one or more digital to analog converters, and other functionality, as typically found in microcontroller devices. Microcontroller 102 is shown with software 103, for example stored within a memory of microcontroller 102, which contains machine readable instructions that, when executed by microcontroller 102, performs functionality of system 100 as describe below. Software 103 may be permanently stored within memory of microcontroller 102, or may be read into registers or temporary memory, that is, software 103 may be field programmable. In embodiments where software 103 is field programmable, it may be loaded into the registers or temporary memory in situations such as start up of system 100, to stream instant notifications, to provide updated content such as messages, comments, audible or display cues, or to change individual or group settings of software 103.

Peripheral vision device 104 is controlled by microcontroller 102 and positioned within a peripheral vision area of a user of system 100 such that the user may absorb displayed information without repositioning and/or refocusing his or her vision. System 100 receives information from one or more sensors 170a-c (external to system 100) via wireless receiver/transceiver 106. When configured as a transceiver, wireless receiver/transceiver 106 provides bi-directional communication. In one embodiment, wireless receiver/transceiver 106 is part of an ANT communication system, as provided by Nordic Semiconductor. In another embodiment, wireless receiver/transceiver 106 supports Bluetooth communication.

System 100 has a user interface 150 for receiving input from the user. User interface 150 may include one or more of: an actuator 152, motion sensors 154, proximity sensors 156, capacitive sensors 157 and microphones 158. Actuator 152 represents an input device (e.g., one or more of a push button switch, a slider switch, and a slider potentiometer) that allows the user to interact with microcontroller 102. In one embodiment, actuator 152 is used to activate and deactivate system 100. Motion sensors 154 may include one or more accelerometers and/or gyroscopes for detecting movement of system 100. Proximity sensor 156 detects proximity changes of system 100 relative to other objects (e.g., the user's hand). Capacitive sensor 157 detects changes in capacitance, such as touch of the user's finger and motion of that finger along a surface proximate to capacitive sensor 157. Other types of sensor may be used in place of capacitive sensor 157 for detecting touch gestures of the user without departing from the scope hereof. User interface 150 allows system 100 to recognize user gestures, such as: button pushes (long and/or short duration); taps—single, double, or triple taps by the user on system 100; and movements such as head tilts, and head nods and/or head shakes, and touch gestures such as finger motion along a surface of system 100. Microcontroller 102 may interpret input from single and multiple sensors (e.g., button pushes, taps, and touches) from the user as sensed by user interface 150. Other methods of receiving user input may be used without departing from the scope hereof. For example, system 100 may include a sensor for tracking eye movement and/or detecting blinking of an eye, thereby allowing the user to create inputs through blinking and eye movements.

System 100 may also include one or more internal sensors 110 that couple with microcontroller 102 to sense user performance. Internal sensors 110 may include one or more of an accelerometer, a gyroscope, a pressure sensor, a power sensor, a temperature sensor, a light sensor, and a proximity sensor. Optionally, sensors of user interface 150 (e.g., sensors 154, 156) and sensors 110 may provide both user input information and performance information. For example, information received from an accelerometer within sensors 110 may also be interpreted by microcontroller 102 as user input information.

In one embodiment, system 100 also includes an audio output device 120 coupled with microcontroller 102 for generating audio information (e.g., tones and voice information readout) to a user of system 100. Optionally, system 100 has an external audio output device 120' in addition to, or to replace, audio output device 120. System 100 may also optionally include a vibration device 122 that, when activated by microcontroller 102, provides tactile feedback to the user of system 100. In one embodiment, audio output device 120 and vibration device 122 are combined into a single component of system 100.

In one embodiment, system 100 also includes an interface 130 coupled with microcontroller 102 that enables communication between system 100 and an external device such as a personal computer (PC) 172. In this document, "PC" may refer to any one or more of a desktop computer, a laptop or netbook computer, a tablet computer, a smart phone, a personal digital assistant (PDA), a navigation system (e.g., a GPS enabled route mapping system) and/or other similar electronic devices having capability for communicating (wired and/or wirelessly) with system 100. In one example of operation, a PC 172 connects to interface 130 and is used to set configuration 160 of system 100 via a USB interface of interface 130. Configuration 160 may for example define performance zones and thresholds of one or more metrics displayed by system 100, load celebrity voices, custom display patterns, other audio and visual cues and/or combinations thereof, for output by system 100. Interface 130 may also be combined with wireless receiver/transceiver 106 such that system 100 may communicate with the PC wirelessly. For example, in a field programmable embodiment of system 100, interface 130 enables the PC to provide software 103 upon startup of system 100, to provide updates to software 103, or to provide updated content such as notifications, messages, comments, or audible or display cues. In another embodiment, interface 130 represents a transceiver for wirelessly communicating with the PC.

In one embodiment, system 100 includes a removable storage device 132 (e.g., a microSD card) that is coupled to microcontroller 102 such that sensed data and/or configuration 160 of system 100 may be stored thereon. Removable storage device 132 is for example mounted within a socket such that it may be removed and access in other computer systems (e.g., a PC). In one example, information recorded from sensors 110, 154, 156, 170*a-c* and/or microphone 158 may be further processed and/or viewed on the other computer. In another example, configuration 160 if system 100 is prepared within the other computer and stored onto storage device 132 and then installed within system 100, wherein storage device 132 provides configuration 160 that defines zones and other parameters of metrics and displayed data of system 100.

Microcontroller 102 may receive sensed information from one or more external sensors 170*a-c* via wireless receiver/transceiver 106. FIG. 1 illustratively shows three external sensors 170*a-c* wirelessly coupled with system 100. However, more or fewer external sensors 170*a-c* may be used without departing from the scope hereof. For example, no external sensors 170*a-c* may be used when internal sensors 110 provide sufficient information for display of performance data. External sensors 170*a-c* may represent one or more of: a heart rate monitor; a running speed/distance/cadence sensor; a bike speed/distance/cadence/power sensor; a bike computer; an exercise equipment computer (e.g. treadmill); a (Digital) pressure sensor (for height information); a GNSS receiver (e.g., GPS); a temperature sensor; a light sensor; and a proximity sensor.

System 100 provides the user with performance feedback and/or audible information such as, for example: current, average, max or min speed/pace; current, average, max or min heart rate; distance traveled; total energy expended; % through workout; duration; clock time; workout zone transition (or zone number cue); workout zone information (such as "hill climb," "steps," "hot terrain," "windy" and the like); heart rate zone; timer; lap time; current, average, min or max power; and current, average, min or max cadence. System 100 may, in embodiments, store performance information of a user and determine and feed back to the user when personal milestones are reached or a personal best performance is achieved.

In one example of operation, microcontroller 102 receives sensor data from sensors 170*a-c* (if included) via wireless receiver/transceiver 106, from sensors 110 (if included), and from sensors 154 and 156 (if included) of user interface 150. Software 103 is executed within microcontroller 102 to process this sensor data and to control peripheral vision device 104 to display performance data to the user. Where included, audio output device 120 is controlled by microcontroller 102 (e.g., by executing software 103 to control a digital to analog converter) to provide audible information and feedback to the user.

Figure 2:
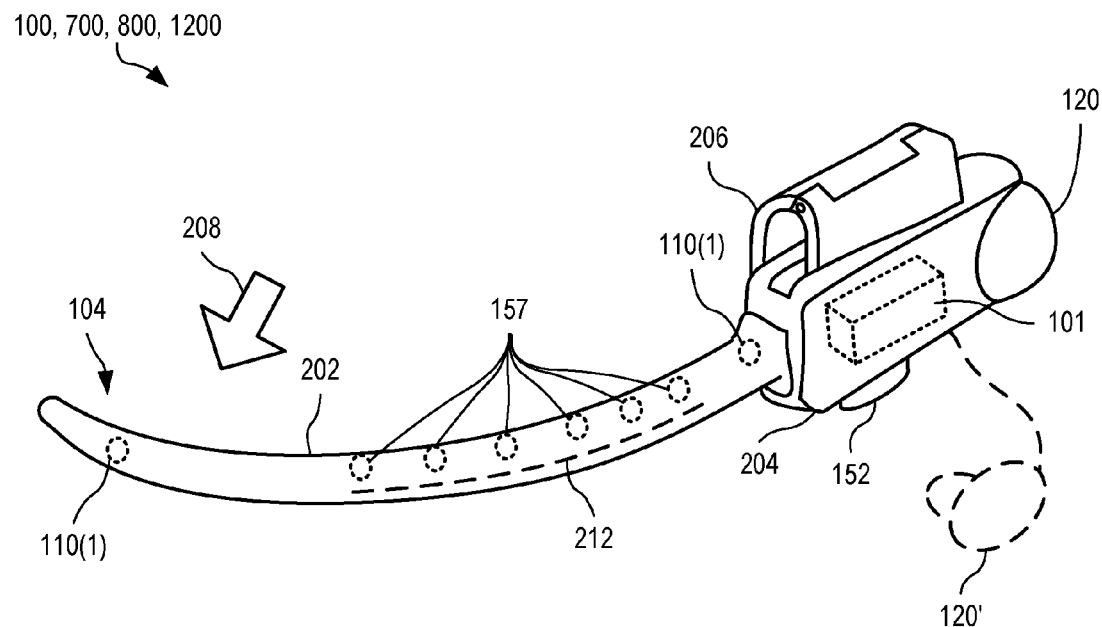
FIG. 2 is a perspective view of one exemplary embodiment of the system of FIG. 1, showing a boom for positioning a peripheral vision device within a peripheral vision area of the user's eye.
Figure 3:
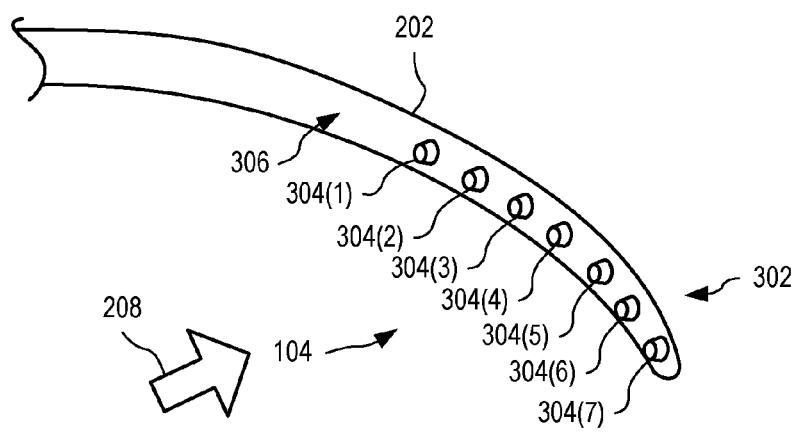
FIG. 3 shows part of the peripheral vision device of FIG. 1 in further detail.

FIG. 2 is a perspective view of one exemplary embodiment of system 100, FIG. 1, configured with a boom 202 for positioning peripheral vision device 104 within a peripheral vision area of the user's eye and a housing 204 that contains electronics 101 (e.g., microcontroller 102, wireless receiver/transceiver 106, internal sensors 110, audio output device 120, user interface 150, and interface 130, if included). FIG. 3 shows peripheral vision device 104 of FIG. 2 in further detail. FIGS. 2 and 3 are best viewed together with the following description.

Boom 202 is a thin flexible substrate attached to, or integral with, housing 204, such that peripheral vision device 104 may be positioned within a peripheral vision area of the user (as indicated by viewing direction 208). The substrate may be encased within a housing material for environmental protection or stiffening purposes. Boom 202 may include a position memory material (e.g., a wire, engineering polymer, shape memory alloy, or other material that maintains its shape after bending) such that once positioned by the user, boom 202 remains substantially in that position during activity by the user, unless moved again by the user. The memory material may also provide torsion memory to boom 202, and may be selectively utilized to provide shape memory in one or more directions (e.g., one-, two- or three-dimensional shape memory). In another embodiment, boom 202 is substantially rigid and shaped to fit a particular application and/or supporting apparatus (e.g., a user's eyewear).

Figure 9:
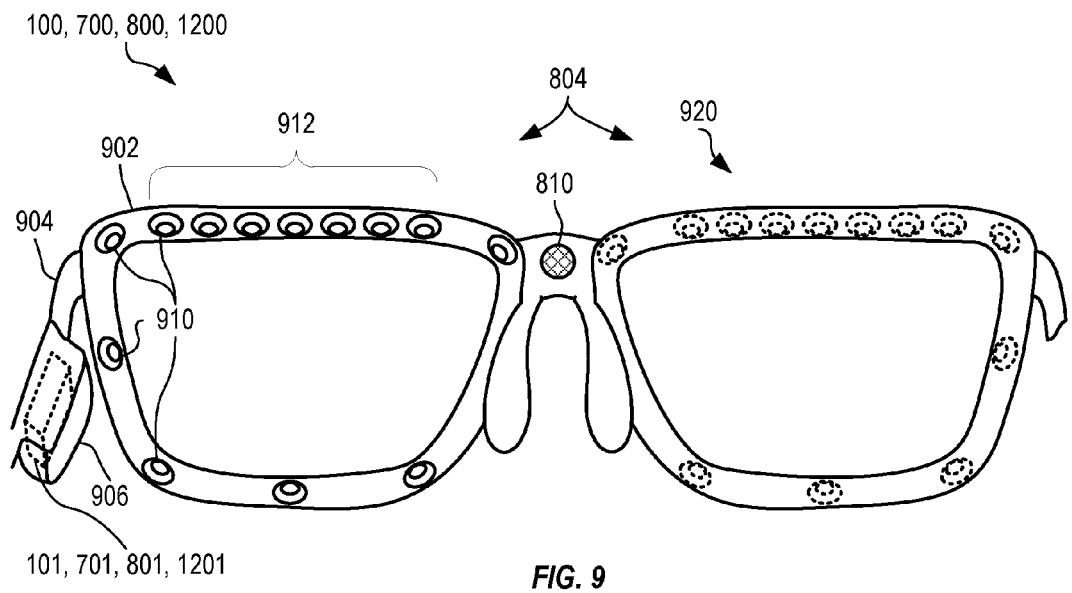
FIG. 9 is an exemplary perspective view showing the system of FIG. 8 configured as a frame of a pair of glasses, in an embodiment.
Figure 14:
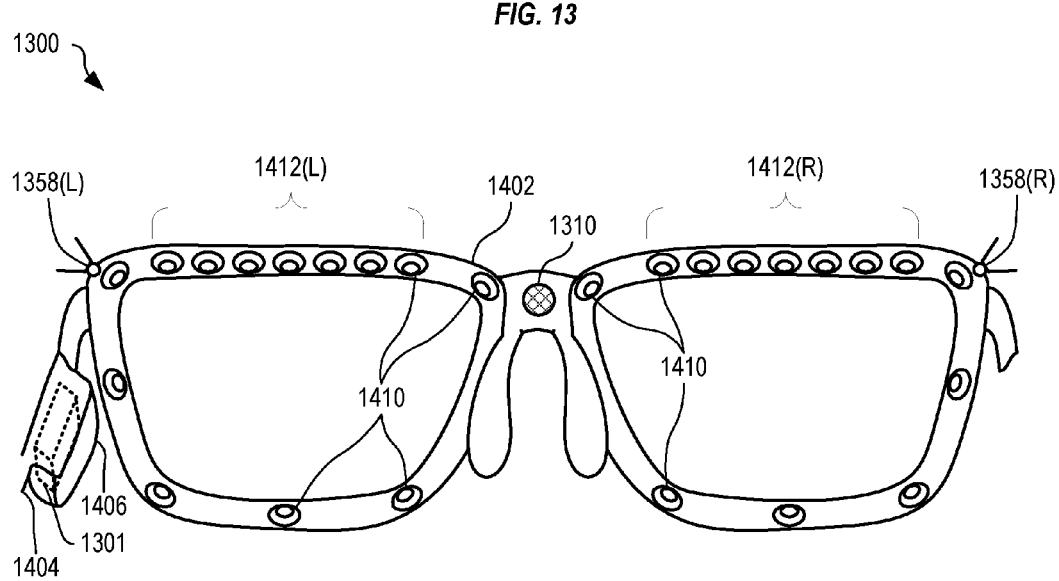
FIG. 14 is a perspective view showing the system of FIG. 13 configured as a frame of a pair of glasses, in an embodiment.

In one embodiment, housing 204 is integral with the supporting headgear or eyewear (see FIGS. 9 and 14 for example). System 100 is also shown with an attachment mechanism 206, coupled with housing 204, for attaching system 100 to a supporting frame, such as a user's eyewear or headwear. In one embodiment, attachment mechanism 206 of system 100 is shaped and configured to mount to a user's ear. In another embodiment, attachment mechanism 206 is shaped and configured to mount to a user's nose. In yet another embodiment, attachment mechanism 206 is shaped and configured to mount to a user's head. System 100 may be configured to attach to objects worn by the user, and may be configured to attach directly to the user. Boom 202 has seven light display elements 304 (1)-(7) formed into a linear array or matrix array at a distal end 302 thereof. Light emitted by light display elements 304 is directed towards the user's eye (or eyes) to maximize visibility and reduce required intensity (and thereby reduce power consumption). Light display element 304 may represent a light emitting diode (LED) or other light sources. Although seven light display elements 304 are shown within peripheral vision device 104, more or fewer light display elements 304 may be included without departing from the scope hereof.

When attached to existing eyewear, boom 202 may be configured such that peripheral vision device 104 is positioned outside the lens, within the lens, inside the frames of the eyewear, outside the frames, and at any peripheral position around the eye. In one embodiment, boom 202 contains optical fibers, and light display elements 304 are located within housing 204 and coupled to the optical fibers such that light is emitted from the distal end 302 of boom 202, for example in a linear array similar to FIG. 3 or in a two dimensional matrix array. Light display elements 304 may be mounted flush with, or just behind a window in, a surface 306 of boom 202.

Boom 202 and housing 204 may attach to existing eyewear for example using adhesive to couple housing 204 to an arm of the eyewear, or attach using adhesive along boom 202. Boom 202 and/or housing 204 may include one or more suction cups for attaching system 100 to existing eyewear and headwear. In one embodiment, boom 202 and/or housing 204 has an attachment feature fabricated from, or overmolded or sprayed with, a "grippy" (that is, slightly sticky or tacky) material that increases the coefficient of friction between boom 202 and a user's glasses for example to prevent undesired movement of boom 202 relative to the glasses. In another embodiment, boom 202 and housing 204 include an ear clip for attaching system 100 to a user's ear such that peripheral vision device 104 may be positioned in a peripheral vision areas of the user's eye without any need for eyewear or headwear.

A plurality of capacitive sensors 157 are illustratively shown configured with boom 202 such that motion of a user's finger along path 212 is detected and interpreted by microcontroller 102. More or fewer capacitive sensors 157 may be integrated with one or both of boom 202 and housing 204 without departing from the scope hereof.

In one embodiment, light display elements 304 mount to, or are integral with, a user's eyewear, such as sunglasses, ski or snowboard goggles, swim goggles, and eyeglasses. In another embodiment, light display elements 304 mount to, or are integral with, a user's headgear, such as a bicycle helmet, a motorbike helmet, a visor, a hat, a cap, a hearing aid, and a headband.

In one embodiment, system 100 has two booms (each similar to boom 202) such that light display elements 304 of peripheral vision device 104 may be positioned in peripheral vision areas both above and below the user's eye. In yet another embodiment, light display elements 304 are formed into a partial or full circle such that light display elements are radially positioned around the user's eye. This may be especially convenient where the light display elements are integrated with the frame of one or both eyewear lenses (see FIGS. 9 and 14), which naturally surrounds the eye. In another embodiment, light display elements 304 are integrated with eyewear such that they have a vertical orientation either side of the user's eye when the eyewear is worn by the user.

In another embodiment, light display elements 304 are mounted in close proximity and visible to both eyes of the user. This may be accomplished with a single piece of display substrate (e.g., clear engineering plastic in the form of a lens), either integrated with (e.g., etched into glass), or externally attached to, the user's existing eyewear or headgear. Alternatively, if appropriate, two separate substrates may be used. In one embodiment, light display elements 304 project light onto at least part of the substrate to make it become visible to the user, for example utilizing polarized light from the one or more light display elements 304.

In FIG. 3, light display elements 304 are formed into a linear array. However, the light display elements 304 may also be formed into two dimensional arrays. For example, light display elements 304 may be formed as two or more rows, wherein each row displays information of a different activity metric. See FIG. 5 for example. Alternatively, the information of a single activity metric may be displayed using the two or more rows. Light display elements 304 may also be configured to provide a 3D (three dimensional) display of information. For example, peripheral vision device 104 may project light that is received differently by each of the user's eyes to form a 3D image (e.g., an image with perceived depth to the user). In one embodiment, light display elements 304 are structured as a 3D array having various heights in regions around the peripheral vision area of the user (e.g., on boom 202).

Light display elements 304 may each emit light at a fixed wavelength (e.g., a fixed color). For example, color of light emitted by each light display element 304 may be selected based upon position of the light display element within the one or two dimensional array. Alternatively, light display elements 304 may each emit a different color under control of microcontroller 102.

FIG. 2 shows exemplary positioning of light sensors 110(1) for detecting ambient light conditions experienced by the user, such that microcontroller 102 may control intensity of light display elements 304 automatically based upon determined ambient light conditions. Light sensors 110(1) represent at least part of sensors 110 of FIG. 1. Light sensors 110(1) are shown in exemplary positions at a tip of boom 202 and at a base of boom 202 of FIG. 2. System 100 may include zero, one or more light sensors 110(1) at the same or other positions without departing from the scope hereof.

In one embodiment, microcontroller 102 interprets the user pressing actuator 152 as an instruction to reduce intensity of light display elements 304. In an embodiment, light display elements 304 do not include lenses, or other optical components; however, one or more lenses may be included to enhance the viewing angle of each light display element. Where light display elements 304 are included in existing eyewear, optical components may be included to correct the effects of lenses within the existing eyewear.

In one embodiment, light display elements 304 are each monocolor LEDs arranged in a linear fashion and embedded within boom 202. In another embodiment, light display elements 304 are each bicolor or tricolor LEDs arranged in a linear fashion and embedded within a soft resin of boom 202. FIGS. 2 and 3 may also represent embodiments of systems 700, 800 and 1200, described herein.

Figure 4:
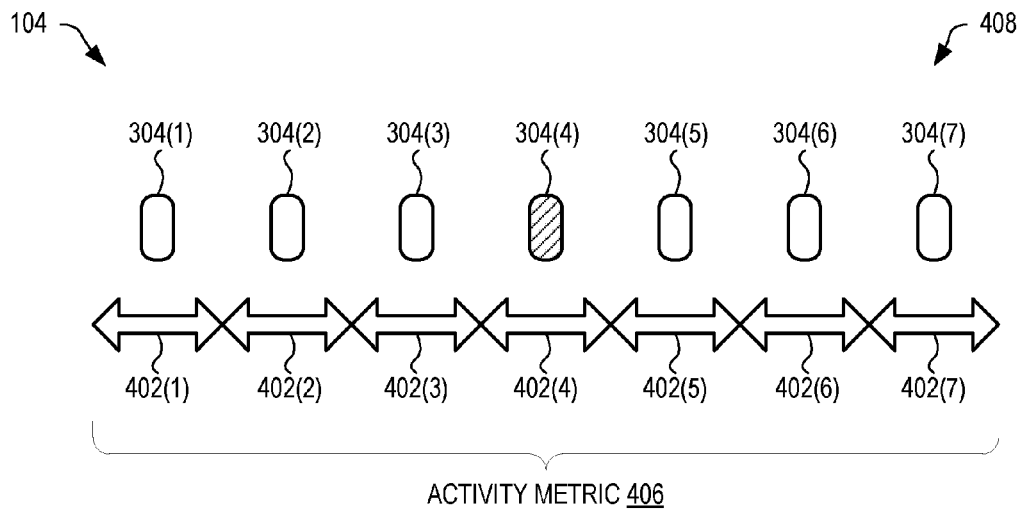
FIG. 4 shows exemplary use of the peripheral vision device of FIG. 3 formed with seven light display elements, in an embodiment.

FIG. 4 shows exemplary use of peripheral vision device 104 formed with seven light display elements 304(1)-(7) of FIG. 3 as configured within system 100 of FIG. 1 to display performance of one or more activities by the user. Microcontroller 102 may utilize one or more of modulation of display element position, intensity, color, flashing rate, flashing duty cycle, fading, multiple element combinations and patterns to generate an illumination pattern 408 for light display elements 304 based upon determined performance information. In one example of operation, system 100 displays each measured metric of a particular activity within a pre-defined performance range. For example, for that particular activity, a heart rate metric may range between 80 beats per minute and 190 beats per minute, wherein an optimal (goal) rate may be 160 beats per minute. In another example, the user may define a target pace of a seven minute mile while running, with a minimum pace of a 9 minute mile and a maximum pace of a 4 minute mile. System 100 may provide feedback to the user for both heart rate and pace. When system 100 provides such goal oriented guidance, once the goal is established, the feedback from system 100 allows the user to be aware of progress towards the goal without requiring the user to lose focus by concentrating on specific metrics or values.

Using user interface 150, the user may select a particular metric for display, wherein microcontroller 102 subdivides minima and maxima of the metric into one or more sequential zones 402, illustrated as arrows within FIG. 4. For example, where the metric is speed, the desired range is between a minimum and a maximum speed; for a heart rate metric, the desired range is between low and high heart rate thresholds. One or more light display elements 304 are assigned to each zone 402, as shown. Specifically, light display element 304(1) is assigned to zone 402(1), light display element 304(2) is assigned to zone 402(2), light display element 304(3) is assigned to zone 402(3), light display element 304(4) is assigned to zone 402(4), light display element 304(5) is assigned to zone 402(5), light display element 304(6) is assigned to zone 402(6), and light display element 304(7) is assigned to zone 402(7). When the user's determined activity level falls within one of these zones, microcontroller 102 generates illumination pattern 408 such that corresponding display element(s) is differentiated from the remaining display elements by modulating one or more visual characteristics, such as intensity, duty cycle, flashing rate, and color.

In the example of FIG. 4, all light display elements 304 are utilized for displaying one activity metric 406. However, light display elements 304 may be divided into smaller virtual arrays for displaying more than one activity metric simultaneously. For example, light display elements 304(1)-(3) may display a first activity metric, light display element 304(4) may display a second activity metric, and light display elements 304(5)-(7) may display a third activity metric. In another embodiment, peripheral vision device 104 automatically cycles between displayed metrics. In another embodiment, peripheral vision device 104 displays the metric indicating greatest variance from a preconfigured goal for that metric.

Figure 5:
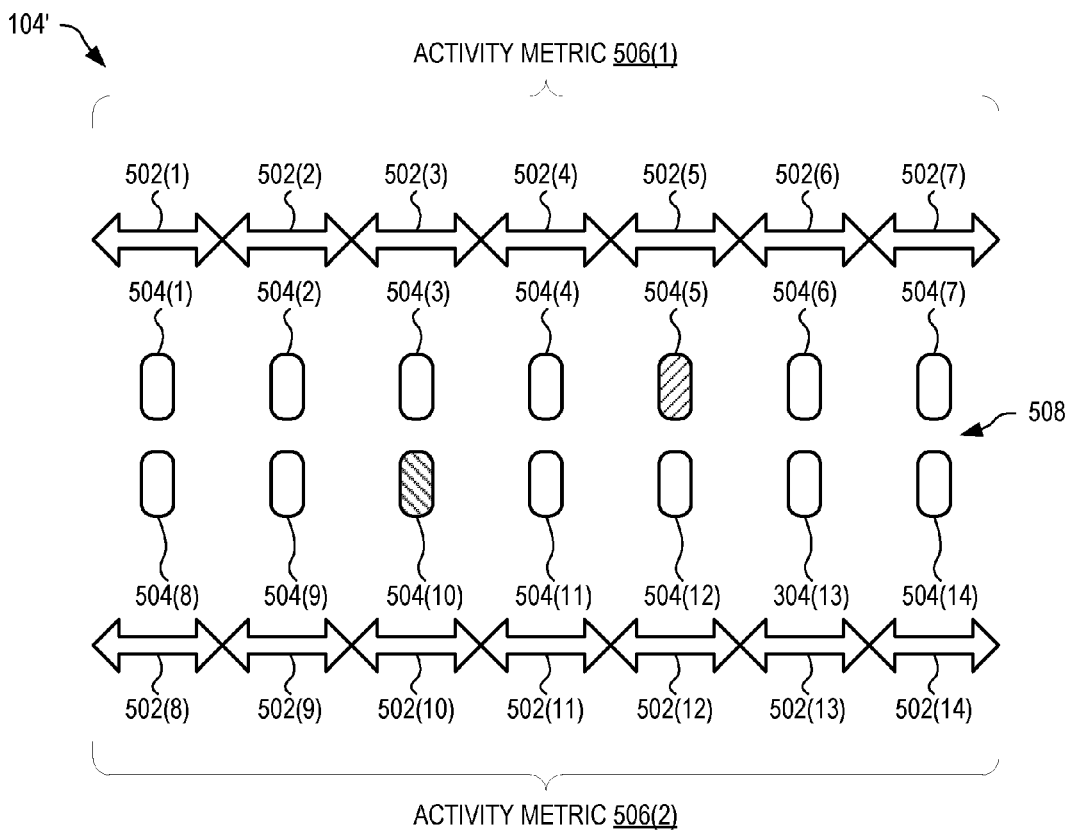
FIG. 5 shows exemplary use of a peripheral vision device formed with two linear rows each of seven light display elements, in an embodiment.

FIG. 5 shows exemplary use of a peripheral vision device 104' having two linear rows of seven light display elements 504 each. In this example, the top row of elements 504(1)-(7) displays a first activity metric 506(1) and the second row of elements 504(8)-(14) displays a second activity metric 506(2). The first activity metric 506(1) is divided into seven zones 502(1)-(7), and the second activity metric 506(2) is divided into seven zones 502(8)-(14). In this example of peripheral vision device 104', light display element 504(5) indicated that a user is performing within zone 502(5) for first activity metric 506(1) and light display element 504(10) indicated that the user is performing in zone 502(10) for second activity metric 506(2). If, in this example, first activity metric 506(1) displays heart rate performance, and second activity metric 506(2) displays pace, and both zones 502(4) and 502(11) represent target zones for each activity, respectively, microcontroller 102 generates an illumination pattern 508 for display on peripheral vision device 104' such that the user may simultaneously see that his or her heart rate is higher, and his or her pace is lower, than their respective target zones. Peripheral vision device 104' may concurrently display more than two metrics. For example, the linear array formed of display elements 504(1)-(7) may be sub-divided to show two different metrics. Alternatively, different colors may be used within the linear array formed of display elements 504(1)-(7), where each color displays a different metric.

Figure 6:
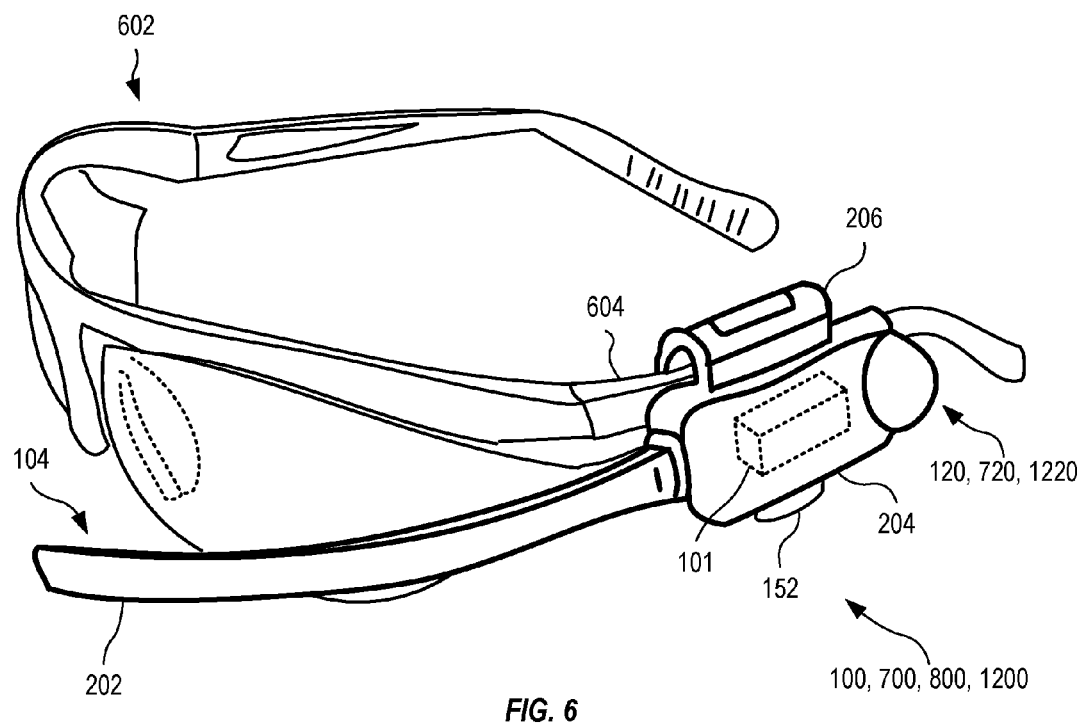
FIG. 6 shows the system of FIG. 2 attached to one arm of a pair of sunglasses, in an embodiment.

FIG. 6 shows system 100 attached to one arm 604 of a pair of sunglasses 602 using attachment mechanism 206 (e.g., a clip) such that boom 202 positions peripheral vision device 104 within a peripheral field of vision of a user wearing sunglasses 602. Although shown positioned outside of the lens of sunglasses 602, the flexibility and position memory of boom 202 allows it to be positioned within the lens of sunglasses 602, as preferred by the user. For example, where boom 202 has an outer gripper material, as described above, boom 202 may be attached to the lower inside surface of the lens. FIG. 6 may also illustrate physical embodiments of systems 700, 800 and 1200.

In an embodiment, system 100 determines the user's performance periodically, and, as the determined performance changes from one zone to another, microcontroller 102 generates illumination patterns (e.g., illumination pattern 408, 508) and controls light display elements 304 to provide feedback to the user. The user may use this feedback to guide his activity towards a desired (preferred or optimal) activity level. Where sensors 170a-c of system 100 monitor activity of other devices (e.g., vehicles, equipments, and so on.), the feedback may guide the user's operation of those devices.

To prevent fatigue of the user's eyes, system 100 may dim or extinguish display elements of peripheral vision device 104 (and optionally other components of system 100). For example, system 100 may display metrics when that metric changes, and later may dim the corresponding display elements to prevent the user's eyes from becoming fatigued. Optional audio output device 120 and optional vibration device 122, if included, may continue to provide performance feedback when display elements of peripheral vision device 104 are dimmed or extinguished, or devices 120 and 122 may be silenced and/or stilled also.

In one embodiment, the range of the currently specified activity metric may be applied across multiple pages of display elements. A single page of information is mapped with some or all display elements and presented at any given time, with pages incrementing or decrementing automatically as the user activity crosses the page thresholds. Alternatively, input from the user (e.g., a nod of the head or a tap on the frame of system 100 detected by accelerometers within system 100) may transition from one page to another. In one example of operation, system 100 may be configured to turn off the display (or fade the display) when the user is operating within defined target zones, and to activate the display when the user varies from those target zones. See flowchart 1900 of FIG. 19 for example. In another example of operation, where a metric display indicates that the user is within a target zone and the user is not within a target zone of a different metric, system 100 may automatically change to display the different metric. Optionally, system 100 may also provide audible and/or vibration feedback when changing the displayed metric.

In one example of operation, system 100 periodically monitors performance of a user and provides feedback using peripheral vision device 104. A central light display element 304(4) indicates that the user has reached a target performance level based upon information received from sensors 110 and/or sensors 170a-c. If the user's performance level changes, microcontroller 102 may alter the displayed illumination pattern to indicate the changes in performance to the user. For example, if the user's performance level drops, light display element 304(3) may illuminate, and light display element 304(4) may extinguish. When the user's performance drops further, the light display element 304(3) is extinguished and light display element 304(2) illuminates. On the other hand, if the uses performance level exceeds the target performance level, light display element 304(5) eliminates and light display element 304(4) is extinguished. In another example of operation, a single light display element 304 indicates a target zone is achieved by the user for at least one metric, and additionally illuminated light display elements 304 indicate variance from that target zone, the greater the number of illuminated light display elements 304, the greater the user's variance from the target zone. In yet another example of operation, variance from a metric target zone is indicated by the number of illuminated light display elements 304, where the greater the user's variance from the target zone, the greater the number of elements illuminated. In another operational example, one or more light display elements 304 are illuminated when the user reaches a target zone, and are extinguished or dimmed when the user varies from that target zone.

The span of the activity metric range, as well as the number of zones, and width of each zone within this range, may be specified or adjusted by the user prior to, or during activity. Optionally, the user may select the light display elements 304 and preferred visual modulation characteristics for one or more zones 402.

Fixed vs. Dynamic Zones

In one embodiment, the span and zone characteristics of each available activity metric are fixed (e.g., within configuration 160) for the duration of the activity session in accordance with predefined settings. In another embodiment, the span and zone characteristics may vary in accordance with a preselected activity profile. For example, the activity profile may be preconfigured (e.g., within configuration 160) by the user using one of a smart phone, a PC, and a tablet computer. In one example of operation, the user defines the activity profile to include an initial warm-up phase at a lower activity level, followed by a higher intensity phase such as during interval training, and finally a lower intensity cool-down phase. The user may select from an available selection of predefined activity profiles, or may define new profiles. For example, the user may define the duration of each activity profile. In one embodiment, zones are automatically adjusted by system 100 when one or more milestones are reached by the user. In another embodiment, zones may be adjusted by a device external to system 100, such as a remote control, PC, smart phone, and tablet PC. For example, a coach may use a remote control device to change a user's zones during a training session. In another embodiment, zones may be automatically changed based upon a wellness environment, where metrics such as a calorie threshold are reached. In yet another embodiment, zones are defined during an activity by the user indicating (e.g., tapping system 100) via user interface 150 that a current intensity of an activity is within a target zone. Similarly, the user may define a lowest range of a zone and a highest range of a zone by indicating using user interface 150.

Activity Metric Display & Selection

In one exemplary configuration, system 100 is connected to a plurality of sensors 110, 170a-c, and displays one activity metric at a time. That is, system 100 allocates light display elements 304 to display the single activity metric, as opposed to displaying multiple activity metrics simultaneously.

User interface 150 allows the user to cycle through the available activity metrics to select one or more activity metrics for display. In one embodiment, sensors 110 include an accelerometer utilized by system 100 to determine activity metrics that also may be used to sense taps on system 100 by the user. In another embodiment, user interface 150 includes a microphone 158 that receives voice commands from the user, wherein microcontroller 102 includes voice recognition capability to interpret the commands to control system 100. In another embodiment, a remote control device is operated by the user to change metrics displayed by system 100. For example, the user may have a remote control device attached to a handlebar of a vehicle being ridden that allows the metric displayed on system 100 to be changed without removing his or her hands from the handlebars. In another example, a coach, teammate, or official has the remote control to select the metric displayed by system 100 to the user. In one embodiment, the remote control is an application (app) running on a smart phone, tablet, or other similar device. The application has the ability to receive metrics (e.g., metrics from a machine being used by the user of system 100, environmental metrics, or other metrics not processed by system 100), perform complex algorithms, and act like a coach to change target zone settings or other performance metrics of system 100 on the fly. The application may be configured to focus on goal oriented performance and may be for example written by (and/or audio cues may be provided using the voice of) a coach or fitness celebrity.

In response to user input, system 100 may provide visual or audio prompts to the user. For example, peripheral vision device 104 may display a specific sequence indicating selection of a desired activity metric for display. Alternatively, each activity metric may have a unique visual characteristic, such as color, to identify the activity metric being displayed.

In one embodiment, light display elements 304 are divided between two or more activity metrics such that these metrics are displayed simultaneously. This allocation of light display elements 304 to one or more activity metrics may be pre-defined and may be defined by the user before or during activity. Thus, the user may receive feedback for multiple activity metrics simultaneously without additional interaction.

In an alternative mode of operation, light display elements 304 may be simultaneously shared among one or more activity metrics by utilizing unique visual characteristics for each activity metric. For example, the determined heart rate of the user may be displayed in the form of a slow-flashing red light display element in a position relative to a heart rate target zone. At the same time, the speed of the user may be displayed as a fast-flashing green light display element within the peripheral vision device at a position relative to a target speed zone. In one embodiment, a single light display element 304 capable of outputting light at any one of a plurality of colors is used to provide multiple metrics, where a particular color indicates a particular metric and where an intensity and/or modulation frequency of light output at that color indicates a value for the metric. In another embodiment, multiple light display elements 304 each capable of outputting light at any one of a plurality of colors allows transition effects to be implemented by system 100 to indicate a change in displayed metric. Exemplary transition effects include a wave effect from one side of peripheral vision device 104 to the other, a curtain effect where transition from one metric to the next starts in the middle of peripheral vision device 104 and progresses towards each side, and a reverse curtain effect where transition from one metric to the next starts at both sides of peripheral vision device 104 and progresses towards the middle.

In one embodiment, light display elements 304 are implemented as seven tricolor LEDs that are each assigned to predefined training zones obtained by subdividing a user-defined minimum-maximum span for each activity metric. As the determined performance of the user transitions into each zone, the corresponding LED will flash for several seconds before fading away to reduce annoyance to the user. The user will most often attempt to center his activity in the 'central' training zone, which is the 3rd LED from either side. The user can cycle between available activity metrics by tapping system 100 (or using other input method of user interface 150) to change modes. In addition, system 100 allows the user to specify custom activity profiles for each activity metric such that the zone mapping is modified dynamically during the training session. The objective for the user is to maintain his performance within the centrally displayed zone through the duration of the training session, which will require that he adjusts his effort to match the current zone profile.

Audio Output

If audio output device 120 is included within system 100, audible voice or sound cues may also be provided to the user based upon determined activity performance metrics, and to provide operational feedback prompts to the user. For example, system 100 may be configured to provide, via audio output device 120, motivational support based upon detected activity performance of the user. Optionally, audio output device 120 may be configured to play custom audio clips from music tracks and provide other tones to indicate measured performance. In one embodiment, one or more audio clips and music files may be stored within storage device 132 and retrieved by microcontroller 102 and played using audio output device 120. In another embodiment, audio data is downloaded via one or both of wireless receiver/transceiver 106 and interface 130. Audio output device 120 may include a voice synthesis module 121 for generating voice output. In one example of operation, the user of system 100 downloads and installs audio clips of a celebrity that provide prompts and cues for playback during a workout.

Activity performance audio feedback may include audible cues, or a verbal description of the user's speed, distance, workout time, or other current, average, and/or historical activity metric. This audio feedback may be provided on demand as a result of a user input, or may be provided at predefined activity points (e.g., when the user reaches an activity objective or crosses a threshold related to one or more activity metrics) or based upon one or more predetermined time intervals. In one example of operation, system 100 provides a verbal readout of a user's heart rate determined at predefined 5 minute or 1 mile intervals. In another example of operation, system 100 provides a verbal notification that a user's average speed for the current session has dropped below a predefined threshold; the user is thereby made aware that a performance adjustment is required to achieve a desired level. In another example of operation, system 100 provides a verbal notification to a user of remaining time and/or distance in the current session. In another example of operation, system 100 provides an audible indication using audio output device 120 when the user's performance transitions between zones (e.g., transitions from zone 402(4) to zone 402(3)). Feedback is not limited to the user's performance, but may also include vehicular performance metrics, safety metrics, gaming metrics, warnings, and other useful information.

System 100 may provide operational feedback prompts that include audible cues during mode transitions, on or off transitions, active sensor changes, configuration setting adjustment, and low battery status. Audio output device 120 may include (wired or wireless) one or more of speakers, ear inserts, and headphones, each of which may be mechanically integrated, attached, or detached from peripheral vision device 104. In one embodiment, audio output device 120 includes a speaker that is positioned in close proximity to, and directed towards, the user's ear to maximize the available volume to the user. Audio output device 120 may provide audible cues to the user such as for downloading, charging, uploading, update available, connected, and disconnected.

System Configuration

Configuration 160 of system 100 may be defined using PC 172 (e.g., a MAC or Windows based personal computer, laptop, tablet PC, and smart phone) connected to interface 130 via communication path 174. In one embodiment, interface 130 represents a Bluetooth interface that is incorporated within wireless receiver/transceiver 106, and communication path 174 is wireless, thereby allowing system 100 to be configured wirelessly and without a physical connection. In another embodiment, interface 130 and wireless receiver/transceiver 106 are packaged together with microcontroller 102. In yet another embodiment, interface 130 represents a wired connection with PC 172 and communication path 174 is a wired connection such as a USB cable. System 100 may use other wired and/or wireless communication devices and modules without departing from the scope hereof. For example, system 100 may utilize one or more of WiFi, ANT FS, Bluetooth, Bluetooth Low Energy (BTLE), Zigbee, EM, and other such protocols and interfaces.

In one embodiment, a user connects system 100 to PC 172 for configuration and customization. While connected to PC 172, configuration 160 of system 100 may be defined for future use, performance metric data may be downloaded and saved to the device, and firmware (e.g., software 103 within microcontroller 102) within system 100 may be updated. In one example, a graphical user interface (GUI) based application may run on the PC to support configuration and control of system 100. In one embodiment, system 100 utilizes a GUI running on the external device for displaying data and interacting with the user.

A user may utilize the PC GUI application to select or design activity profiles (e.g., workout profiles). For example, the user may generate a time series graph of a desired activity metric profile as a function of time, and select the associated target zone thresholds for one or more activity metrics. The PC GUI application may process the graph to generate a configuration file that is uploaded to system 100. In one embodiment, system 100 stores a plurality of predefined profiles (e.g., within configuration 160) that may be selected by the user (e.g., by interacting with user interface 150) without need of a PC.

The PC GUI application may also allow sharing, via the Internet for example, of generated workout profiles. For example, a coach could prepare a week's worth of workout profiles and send them to each team member. At the end of the week each team member may upload their recorded performance data to a server (e.g., via a web site) such that team members performance may be graphically compared (e.g., by the team coach). Optionally, generated workout profiles may be shared directly between multiple systems 100, for example to allow collaborative workouts.

In one embodiment, the PC GUI application provides a map interface on which the user draws a desired route, or allows the user to select from historical routes, or to select from routes published by other users. In one embodiment, the PC GUI displays a map and allows the user to select a desired path, the coordinates of which form a route profile that the user wishes to follow during training. The PC GUI may then allow the user to specify desired performance metrics at various points along the route. During operation, in addition to providing performance feedback to the user as described above, system 100 may provide turn-by-turn guidance to the user indicates, either by using peripheral vision device 104 or by using an audible prompt. For example, system 100 may prompt the users that a turn in the predefined route is approaching. System 100 may also provide other information to the user, such as safety information including approaching hazards, and may also provide information such as approaching sustenance points, such as water, food, fuel, and so on. Alternatively, system 100 may provide directional information to allow the user to find these points, and/or avoid hazards.

In another embodiment, system 100 allows the user to record information during an activity. For example, on a cycle ride, a user instructs system 100 to record a hazard at the current location, whereupon system 100 determines (e.g., using a GPS sensor, time on journey, or other metrics) a current location of the user and transmits that information to the PC GUI application, where it is annotated to a map in the form of a symbol and/or transcribed text from the users recorded speech.

Automatic Mode Detection

System 100 may automatically detect a mode of use. Detected modes may include stopped, walking, running, and cycling. System 100 may utilize one or more of sensors 110 and 170a-c to determine the current mode. For example, microcontroller 102 may process a signal from an accelerometer to detect a walking gait within the signal, and may process a signal from a GNSS receiver to determine that the user is moving at a speed of 2 miles per hour. Based upon these two signals, system 100 may therefore determine that the user is walking. In another example, system 100 may determine that the user is cycling if a measured speed of the user is between 6 and 30 miles per hour and a cadence is within a cycling range. System 100 may utilize input from more than one sensor to determine a current activity of the user. If the determined mode transitions, system 100 may generate an audio prompt to request confirmation of the mode change (e.g., by tapping or other input to user interface 150) by the user.

Other Features

In one embodiment, system 100 utilizes wireless receiver/transceiver 106 (or an additional wireless receiver) to receive voice communication data for playing through audio output device 120. In another embodiment, system 100 includes a transceiver (e.g., in place of or together with wireless receiver/transceiver 106) that receives voice communication data from other systems, and transmits voice communication data received via microphone 158 from the user to other systems, thereby providing two way wireless voice communication between users of system 100. See for example FIG. 20 and its associated description. In one example of operation of this embodiment, voice input is received via microphone 158 and transmitted via wireless receiver/transceiver 106 to an external device where it is interpreted and acted upon, such as to control gear selection in a vehicle and/or operation of lights. In one embodiment, voice commands received via microphone 158 are interpreted by microcontroller 102 as input to system 100.

In another similar embodiment, wireless receiver/transceiver 106 of system 100 receives voice communications from a coach station 2002 such that a coach may communicate in real time with the user (e.g., to provide additional feedback and/or tips).

In another embodiment, system 100 includes a transmitter for broadcasting performance information (or raw sensor data) as a wireless signal 2004 to coach station 2002. Coach station 2002 may represent a mobile device such as one or more of a smart phone, a laptop computer, and a tablet computer). Coach station 2002 may then display instantaneous graphing and provide near-field feedback to allow the coach to view performance data substantially in real-time.

Figure 7:
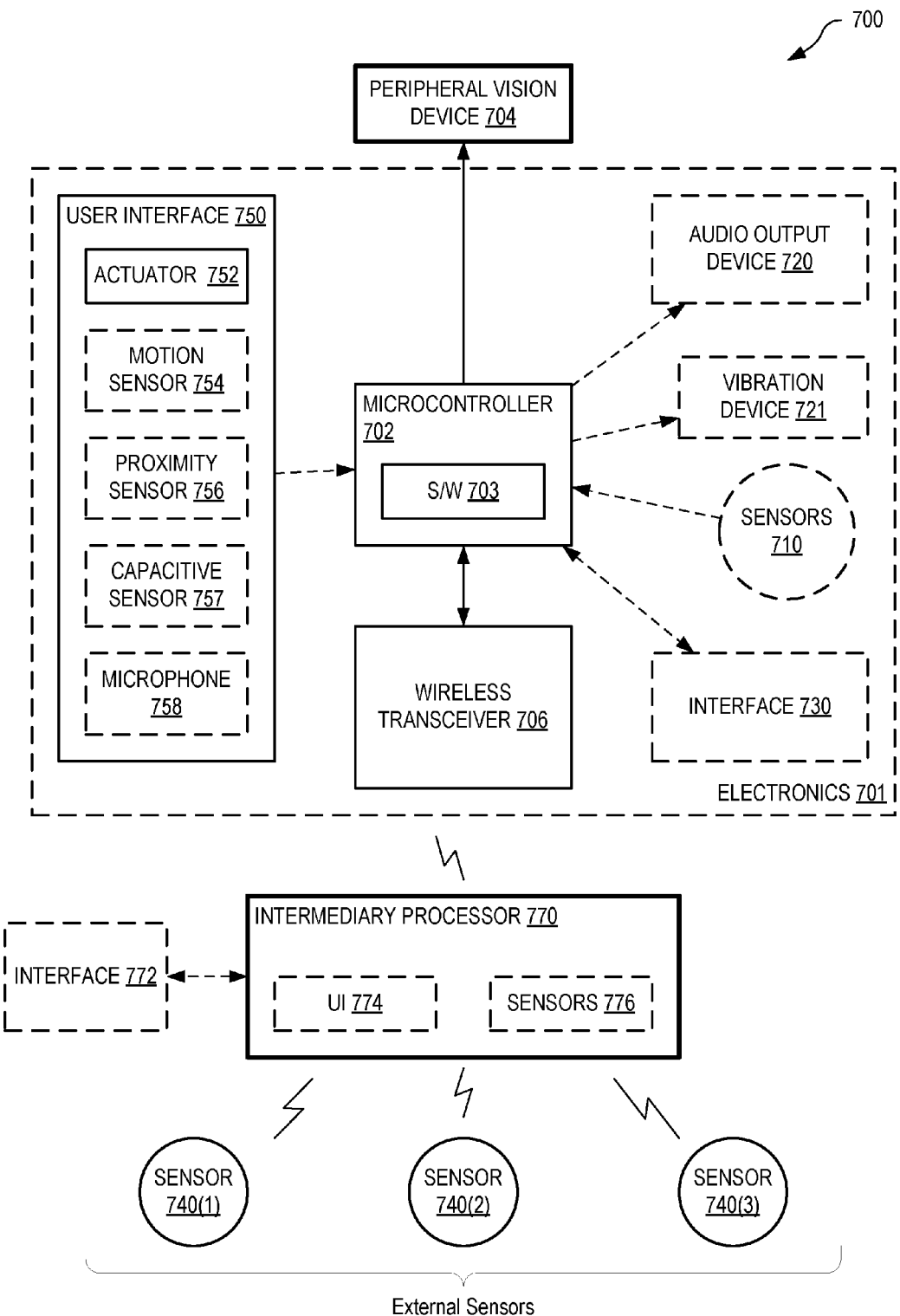
FIG. 7 schematically shows one exemplary head-mounted peripheral vision display system for displaying performance information generated by a remote intermediary processor, in an embodiment.

FIG. 7 shows one exemplary head-mounted system 700 for displaying performance information generated by a remote intermediary processor 770. System 700 is similar to system 100, FIG. 1, and includes a microcontroller 702, a peripheral vision device 704, and a wireless transceiver 706. Microcontroller 702 may include memory (non-volatile and volatile), one or more analog to digital converters, and other functionality, as typically found in microcontroller devices. Microcontroller 702 is shown with software 703, stored within a memory of microcontroller 702 for example, which contains machine readable instructions that when executed by microcontroller 702 perform functionality of system 700. Peripheral vision device 704 is controlled by microcontroller 702 and positioned within a peripheral vision area of a user of system 700.

System 700 receives performance information wirelessly from remote intermediary processor 770, which is external to system 700. Optionally, microcontroller 702 also determines performance information from one or more of sensors 710, 754, and 756, if included. Intermediary processor 770 receives sensor data from external sensors 740 (either wirelessly as shown in FIG. 7, or wired) and determines performance of the user based upon that data. Intermediary processor 770 may also include one or more internal sensors 776 for sensing activity of a user and/or a device. Intermediary processor 770 then transmits the determined performance to microcontroller 702 via wireless transceiver 706 for display on peripheral vision device 704.

System 700 has a user interface 750 for receiving input from the user that may include one or more of: an actuator 752, a motion sensor 754, a proximity sensor 756, a capacitive sensor 757, and a microphone 758. Operation of user interface 750 is similar to operation of user interface 150 of system 100, FIG. 1. Actuator 752 represents an input device (e.g., a push button switch) and/or a slider that allows the user to interact with microcontroller 702. In one embodiment, actuator 752 is used to activate and deactivate system 700. Motion sensors 754 may include one or more accelerometers and/or gyroscopes for detecting movement of system 700. Proximity sensor 756 detects proximity changes of system 700 relative to other objects (e.g., the user's hand). Capacitive sensor 757 detects changes in capacitance, such as touch of the user's finger and motion of that finger along a surface proximate to capacitive sensor 757. Microphone 758 may be used to receive voice commands from the user. User interface 750 allows system 700 to recognize user gestures, such as: button pushes (long and/or short duration); taps—single, double, and triple taps and finger presence/touch/motion by the user on system 700; and user movements such as head tilts, and head nods and/or shakes. Microcontroller 702 may also interpret combinations of inputs (e.g., button pushes and taps) from the user as sensed by user interface 750.

System 700 may also include one or more internal sensors 710 that couple with microcontroller 702 to sense performance of the user. The internal sensors 710 may include one or more of an accelerometer, a gyroscope, a pressure sensor, a GNSS receiver (e.g., GPS), a power sensor, a temperature sensor, a light sensor, and a proximity sensor. Optionally, sensors of user interface 750 and sensors 710 may provide both user input information and performance information. For example, information received from an accelerometer within sensors 710 may also be interpreted provide user input information.

System 700 may also include an audio output device 720 coupled with microcontroller 702 for generating audio information (e.g., tones and voice information readout) to a user of system 700. System 700 may also include a vibration device 721 for providing tactile feedback to the user.

System 700 may also include a interface 730 coupled with microcontroller 702 that enables communication between system 700 and one or more of a PC, a smart phone, a tablet, and other intelligent devices having wireless capability. In one example of operation, a PC is used to configure performance zones and thresholds of system 700 via a USB interface of interface 730. Interface 730 may represent any known communication means for communicating with an external device. In one embodiment, interface 730 may be incorporated within wireless transceiver 706. In one example of operation, system 700 utilizes one or more of user interface 750 and sensor 710 to allow a user to configure system 700.

External sensors 740 and intermediary processor 770 may represent, alone or on combination, one or more of: a smart phone, a heart rate monitor; a running speed/distance/cadence sensor; a vehicle engine management unit; a bike speed/distance/cadence/power sensor; a bike computer; an exercise equipment computer (e.g., treadmill); a (digital) pressure sensor (for height information); a GNSS receiver (e.g., GPS); a temperature sensor; a light sensor; a proximity sensor, and other such devices. Optionally, intermediary processor 770 may utilize an interface 772 for configuration of a desired performance. For example, interface 772 may attach to intermediary processor 770 or may be incorporated within intermediary processor 770. Interface 772 may provide WiFi, Bluetooth, USB, and other wired and wireless communication capability for communicating with a PC, a tablet computer, a smart phone. Optionally, intermediary processor 770 may include a user interface 774 for interaction with a user. External sensors 740 may represent other sensors for sensing other activities without departing from the scope hereof. Intermediary processor 770 includes software such that a microcontroller of intermediary processor, executing the software, processes signals from the internal sensors 776 and/or external sensors 740 to determine performance of the user or vehicle being ridden or driven by the user. One or more external sensors 740 may also be directly wired thereto (i.e., without requiring a wireless interface).

In one embodiment, where intermediary processor 770 is a smart phone, microcontroller 702 utilizes wireless transceiver 706 for bi-directional communication with intermediary processor 770, and may send raw data, collected from one or more of sensors 710, 754, 756, and/or microphone 758 of system 700 to intermediary processor 770 for processing. Microcontroller 702 may then receive processing results from intermediary processor 770 for optional further processing and display on peripheral vision device 704.

System 700 may provide the user with performance feedback such as: current, average, max or min speed/pace; current, average, max or min heart rate; distance traveled; total energy expended; % through workout; duration; clock time; workout zone transition (or zone number cue); heart rate zone; timer; lap time; current, average, min or max power; and current, average, min or max cadence. In one example, system 700 provides an indication of when the user should replenish energy and/or rehydrate based upon total energy expended by the user and/or other sensed conditions of the user.

In one example of operation, microcontroller 702 receives performance information from intermediary processor 770 via wireless transceiver 706, sensor data from sensors 710 if included, and from sensors 754 and 756 of user interface 750. Software 703 is executed within microcontroller 702 to process this performance information and sensor data, to generate an illumination pattern (e.g., illumination pattern 408, 508), and to control peripheral vision device 704 to display the illumination pattern using peripheral vision device 704 such that the user is informed of the determined performance. Where included, audio output device 720 is also controlled by microcontroller 702 (e.g., when executing software 703) to provide audible information to the user.

In one embodiment, intermediary processor 770 and external sensors 740 are integrated with a waterproof housing that couples to a swimmer's body (e.g., at the neck). Similarly, electronics 701 are enclosed within a waterproof housing and integrated with swimming goggles, such that the user when wearing system 700 and intermediary processor 770 may receive feedback on swimming metrics, such as length time, stroke rate, and so on. For example, sensors 710 and 740 may represent one or more of accelerometers, gyroscopes and light detectors for sensing swimming activity of the user.

In one embodiment, intermediary processor 770 is a smart phone (e.g., an iPhone® or other similar device), a tablet computer (e.g., an iPad® or other similar device), or a media player (e.g., an iPod® or iPod Touch® or other similar device), a bicycle computer, a netbook, or other such device. User interface 750 of system 700 may be used to control intermediary processor 770, for example to adjust playback of audio from intermediary processor 770 via audio output device 720.

Figure 8:
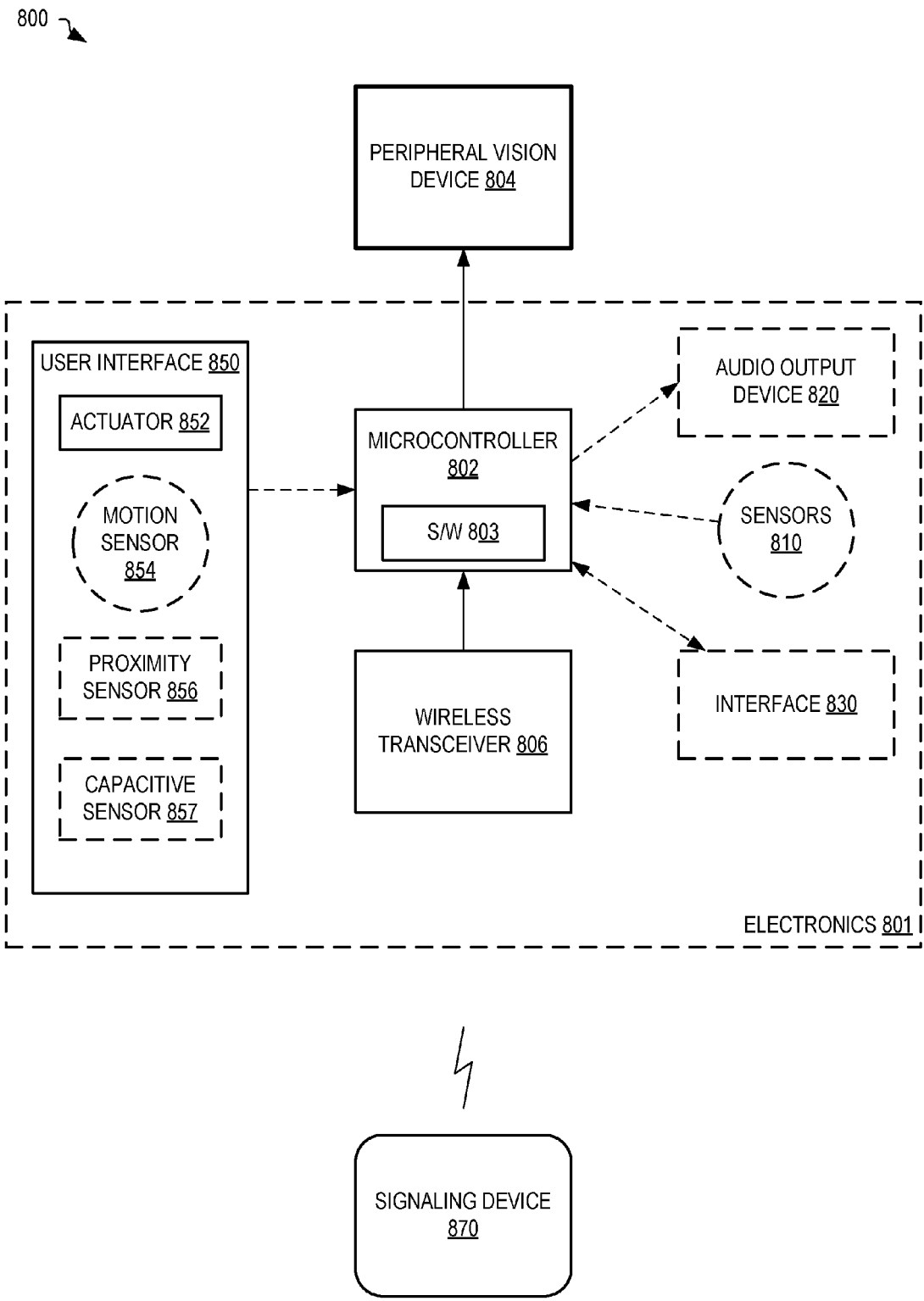
FIG. 8 schematically shows one exemplary head mounted system for displaying signal information within a peripheral vision area of a user, in an embodiment.

FIG. 8 shows one exemplary head mounted system 800 for displaying signal information within a peripheral vision area of a user. System 800 includes a microcontroller 802, a peripheral vision device 804, and a wireless transceiver 806. Microcontroller 802 may include memory (non-volatile and volatile), one or more analog to digital converters, and other functionality, as typically found in microcontroller devices. Microcontroller 802 is shown with software 803, stored within a memory of microcontroller 802 for example, which includes machine readable instructions that when executed by microcontroller 802 performs functionality of system 800.

Peripheral vision device 804 is controlled by microcontroller 802 and positioned within a peripheral vision area of a user of system 800. System 800 receives performance information from signaling device 870 via wireless transceiver 806. Wireless transceiver 806 may have the capability of one or more of WiFi, Bluetooth, and other wireless protocols. Signaling device 870 may represent one or more of a mobile phone, an alarm system, a tablet computer, a PC, a vehicle engine management unit, a control system, and other such similar systems. Signaling device 870 transmits a signal to microcontroller 802 via wireless transceiver 806 to indicate a status (e.g., of a device or system being monitored by signaling device 870). Microcontroller 802 then generates an illumination pattern based upon the signal and controls peripheral vision device 804 to display the illumination pattern to indicate the status to the user.

System 800 has a user interface 850 for receiving input from the user. User interface 850 may include one or more of: an actuator 852, motion sensors 854, a proximity sensor 856, and a capacitive sensor 857. Actuator 852 represents an input device (e.g., a push button switch and/or a slider) that allows the user to interact with microcontroller 802. In one embodiment, actuator 852 is used to activate and deactivate system 800. Motion sensor 854 may include one or more accelerometers and/or gyroscopes for detecting movement of system 800. Proximity sensor 856 detects proximity changes of system 800 relative to other objects (e.g., the user's hand). Capacitive sensor 857 detects touch and/or motion of a user's fingertips on a surface proximate sensor 857 as an input to system 800. Microcontroller 802 may detect gestures by the user using one or more of motion sensor 854 and capacitive sensor 857. User interface 850 allows system 800 to recognize user gestures, such as: button pushes (long and/or short duration); taps—single, double, or triple taps by the user on system 800; finger touches and sliding motion; and user movements such as head tilts, and head nods and/or shakes. Microcontroller 802 may also interpret combinations of inputs (e.g., gestures, button pushes and taps) from the user as sensed by user interface 850.

System 800 may also include one or more internal sensors 810 that couple with microcontroller 802 to sense performance of the user or other environmental conditions. The internal sensors 810 may represent one or more of an accelerometer, a GNSS receiver, a gyroscope, a pressure sensor, a power sensor, a temperature sensor, a light sensor, and a proximity sensor. In one example, internal sensor 810 senses temperature of the user. In another example, sensor 810 senses environmental light levels. Optionally, sensors of user interface 850 and internal sensors 810 may provide both user input information and performance information. For example, information received from an accelerometer of sensors 810 may also be used to detect user input information.

System 800 may also include an audio output device 820 coupled with microcontroller 802 for generating audio information (e.g., tones and voice information readout) to a user of system 800. In one embodiment, audio output device 820 also includes a vibration device for signaling to the user where audio signals may not be heard (e.g., in noisy environments).

System 800 may also include an interface 830 coupled with microcontroller 802 that enables communication between system 800 and a PC. In one example of operation, a personal computer may be used to configure performance zones and thresholds of system 800 via a USB interface of interface 830. In one embodiment, interface 830 may be incorporated within wireless transceiver 806, wherein system 800 communicates wirelessly with one or more of a PC, a tablet computer, a smart phone, and other devices having wireless capability. In another example, system 800 utilizes one or more of user interface 850 and internal sensor 810 to allow a user to configure system 800.

FIG. 9 is an exemplary perspective view showing system 800 of FIG. 8 configured as a frame 902 for a pair of glasses. A plurality of light display elements 910 are positioned within frames 902 around one or both lenses to form peripheral vision device 804 such that light display elements 910 are within a peripheral vision area of one or both eyes of the user when the glasses are worn. Although shown with thirteen light display elements 910 on each half of frame 902, system 800 may have more of fewer light display elements without departing from the scope hereof.

Light display elements 910 may be positioned to form a linear array 912 such that level signals may be displayed (e.g., the number of light display elements illuminated within array 912 may indicate a level). Each of light display elements 910 may be a single color, bicolor or tricolor, to convey information to the user. The linear array may be positioned at any point around the user's peripheral vision area, such as at the bottom or side of frame 902. One or more of light display elements 910 may operate to project light onto other objects for viewing by the user. For example, light display elements 910 may project light onto a lens (polarized or non-polarized) that is within the peripheral field of vision of the user when wearing the glasses integrated with system 800. In another example, light display elements 910 project light onto an intermediate lens or screen which is within the peripheral field of vision of the user when wearing the glasses integrated with system 800.

A housing 906 formed on ear piece 904 of frames 902 contains electronics 801 that includes microcontroller 802, wireless transceiver 806, and user interface 850, and optionally includes interface 830 and internal sensors 810. Housing 906 may also be positioned at other convenient and/or ergonomic locations on frames 902 without departing from the scope hereof. Housing 906 may also include a battery (not shown) for powering electronics 801 and peripheral vision device 804. The battery may also be positioned elsewhere (e.g., within a separate housing on the other ear piece of the glasses) without departing from the scope hereof. In one embodiment, a housing (e.g., housing 906) may be positioned on each earpiece of frames 902 and electronics 101, 701, 801, and 1201, distributed therebetween.

System 800 may include other sources of energy, such as energy harvesting systems, solar energy collectors, and so on, without departing from the scope hereof.

In one example of use, signaling device 870 represents a heart rate monitoring device that is measuring the heart rate of a patient within a hospital, and where system 800, in the form of frames 902, is worn by a doctor performing a procedure on the patient. While maintaining his view on the procedure being performed, the doctor receives an indication (e.g., periodically, or when one or more predefined thresholds are reached) of the patients heart rate from peripheral vision device 804. The indication may take the form of one or more light display elements 910 flashing to indicate that the patient heart rate has exceeded the predefined threshold, and may utilize array 912 to indicate a rate of change in the measured heart rate (e.g., by a running light effect).

In another example of use, signaling device 870 represents a timer associated with a setting time of cement used by a dentist on a patient's tooth. The dentist has the cement mixed and applies it to the tooth, applying pressure to the tooth (e.g., holding the crown or veneer in place) while the cement sets. Signaling device 870 sends a timing signal to microcontroller 802 via wireless transceiver 806, and microcontroller 802 utilizes peripheral vision device 804 to show a countdown of remaining time (e.g., using array 912). When the timer expires, signaling device 870 sends a signal to microcontroller 802 via wireless transceiver 806, wherein microcontroller flashes a different one of light display elements 910 in a green color to indicate that the cement is set.

In another example of use, sensor 810 includes an infrared temperature sensor (or radiation sensor) that is attached to (or built into) frames 902 and directionally aligned with the view of a user wearing frames 902. Microcontroller 802 receives and processes a signal from this sensor to determine a temperature of an object being viewed. Microcontroller 802 then compares this temperature to at least one threshold (e.g., a maximum temperature) and controls peripheral vision device 804 to indicate a sensed temperature that exceeds the defined threshold. For example, this could provide a warning to the user approaching a hot object. In another example, the array 912 displays an indication of measured temperature, thereby operating as a limited infrared vision aid. It will be appreciated that although FIG. 9 shows system 800 configured as frames 902, systems 100, 700 or 1200 (described below) may likewise be integrated with frames 902.

Frames 902 may also contain other sensors 810 that couple with electronics 801 to enhance safety of a wearer of system 800. For example, sensors 810 may include gas sensors such that system 800 provides a warning to the wearer when a certain gas (or lack thereof) is detected by sensors 810.

Figure 10:
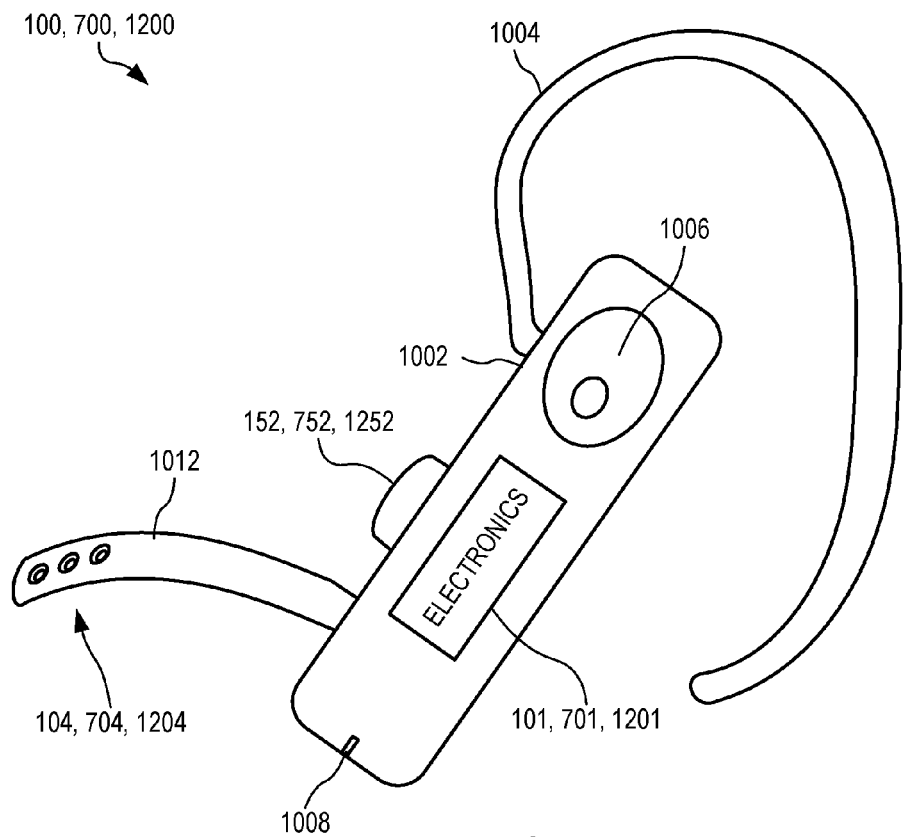
FIG. 10 is a schematic diagram illustrating one embodiment of the systems of FIGS. 1, 7 and 12, configured as a headset body that has an ear clip, an ear piece, and a microphone.

FIG. 10 is a schematic diagram illustrating one embodiment of systems 100, 700, and 1200 in the form of a headset body 1002 that has an ear clip 1004, an ear piece 1006, and a microphone 1008. Ear clip 1004 may optionally include an inner-ear clip (not shown) for securing headset body 1002 in position. Ear piece 1006 is formed to fit the human ear and includes audio output device 120, 720, 820, 1220. Microphone 1008 may represent microphone 158, 758, 1208 of user interface 150, 750, 1250, and/or may represent a microphone of sensors 110, 710 and 1210. Electronics 101, 701, and 1201 within headset body 1002 represent components of microcontroller 102, 702, 1202, user interface 150, 750, 1250, wireless receiver/transceiver 106, wireless transceiver 706, and cellular transceiver 1206. A boom 1012 connected to headset body 1002 positions peripheral vision device 104, 704, and 1204 within a peripheral vision area of the user wearing system 100, 700, and 1200.

Figure 11:
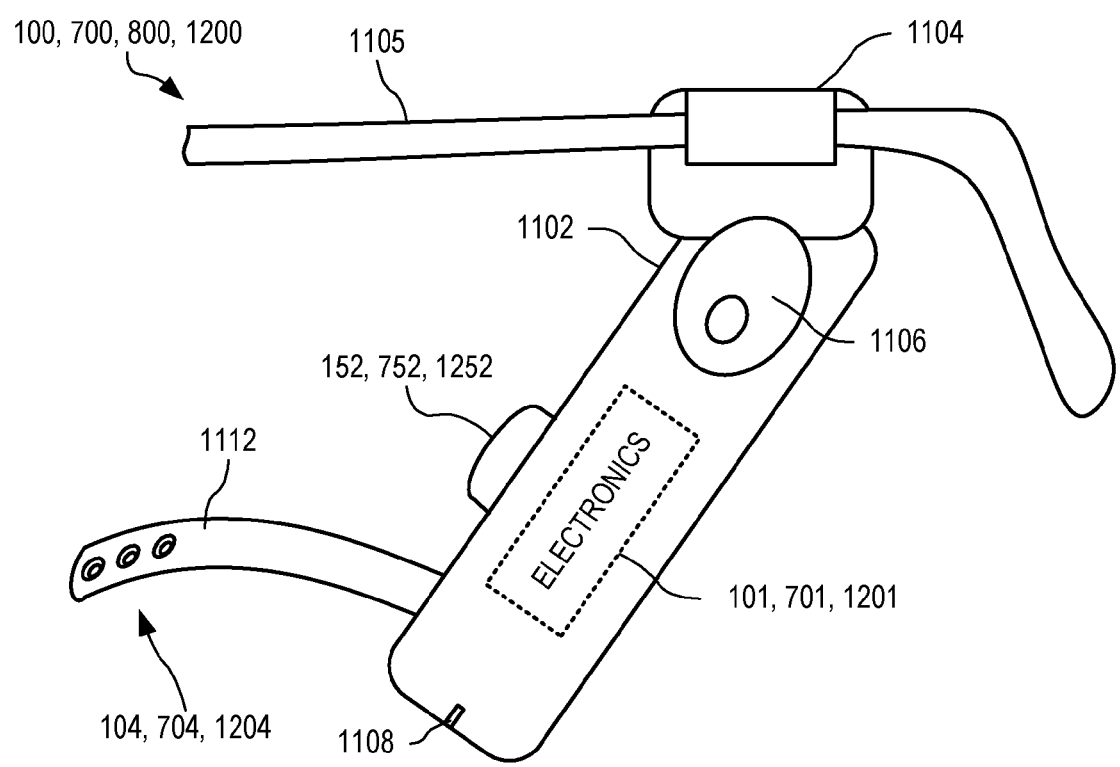
FIG. 11 is a schematic diagram illustrating one embodiment of the systems of FIGS. 1, 7 and 12, configured as a headset body that has a clip, an ear piece, and a microphone.

FIG. 11 is a schematic diagram illustrating one embodiment of systems 100, 700, and 1200 in the form of a headset body 1102 that has a clip 1104, an ear piece 1106, and a microphone 1108. Clip 1104 attaches headset body 1102 to an ear piece 1105 of a pair of glasses, for example. Ear piece 1106 is formed to fit the human ear and includes audio output device 120, 720, 820, 1220. Microphone 1108 may represent microphone 158, 758, 1208 of user interface 150, 750, 1250, and/or may represent a microphone of sensors 110, 710 and 1210. Electronics 101, 701, and 1201 within headset body 1102 represents components of microcontroller 102, 702, 1202, user interface 150, 750, 1250, wireless receiver/transceiver 106, wireless transceiver 706, and cellular transceiver 1206. A boom 1112 connected to headset body 1102 positions peripheral vision device 104, 704, and 1204 within a peripheral vision area of the user wearing system 100, 700, and 1200. Clip 1104 may also attach headset body 1102 to other articles word by the user, such as a helmet, a ball-cap, goggles, and a visor.

Figure 12:
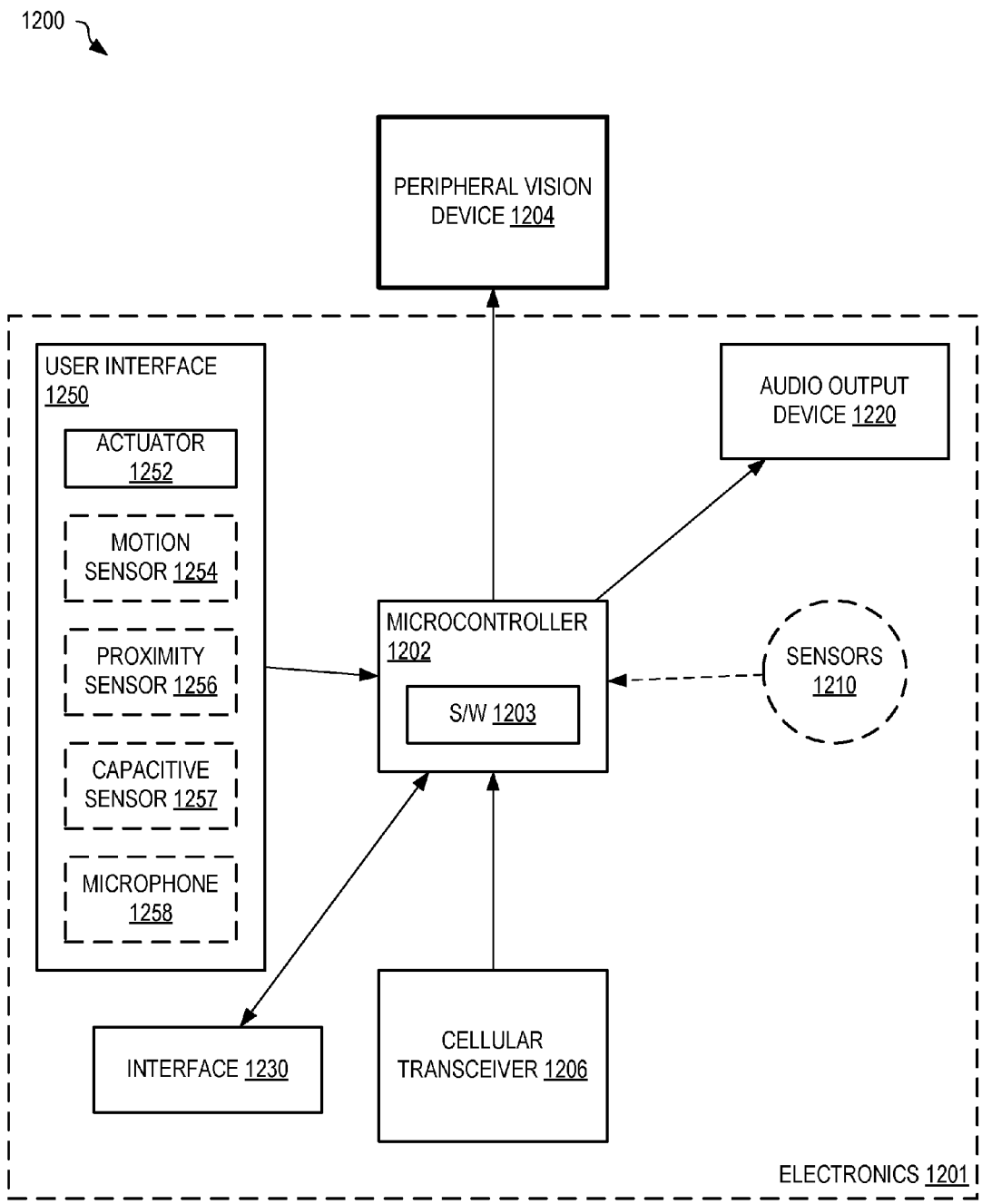
FIG. 12 shows one exemplary head-mounted cellular phone that includes a microcontroller, a peripheral vision device, and a cellular transceiver, in an embodiment.

FIG. 12 shows one exemplary head-mounted cellular phone system 1200 that includes a microcontroller 1202, a peripheral vision device 1204, and a cellular transceiver 1206. Microcontroller 1202 may include memory (non-volatile and volatile), one or more analog to digital converters, and other functionality, as typically found in microcontroller devices. Microcontroller 1202 is shown with software 1203, stored within a memory of microcontroller 1202 for example, which contains machine readable instructions that when executed by microcontroller 1202 performs functionality of system 1200.

Peripheral vision device 1204 is controlled by microcontroller 1202 and positioned within a peripheral vision area of a user of system 1200 for displaying information associated with operation of system 1200. For example, microcontroller 1202 may utilize peripheral vision device 1204 to display an illumination pattern (e.g., illumination pattern 408, 508) that indicates one or more of incoming calls, incoming text messages, incoming emails, calendar events, signal strength, and battery status.

System 1200 has a user interface 1250 for receiving input from the user. User interface 1250 may include one or more of: an actuator 1252, motion sensors 1254, a proximity sensor 1256, and a capacitive sensor 1257. Actuator 1252 represents an input device (e.g., a push button switch) that allows the user to interact with microcontroller 1202. In one embodiment, actuator 1252 is used to activate and deactivate system 1200. Motion sensors 1254 may include one or more accelerometers and/or gyroscopes for detecting movement of system 1200. Proximity sensor 1256 detects proximity changes of system 1200 relative to other objects (e.g., the user's hand). Capacitive sensor 1257 detects touch and/or motion of a user's fingertips on a surface proximate sensor 1257 as an input to system 1200. User interface 1250 allows system 1200 to recognize user gestures, such as: button pushes (long and/or short duration); taps—single, double, or triple taps by the user on system 1200; touches and/or finger movements along a surface of system 1200; and movements such as head tilts, and head nods and/or shakes. Microcontroller 1202 may also interpret combinations of inputs (e.g., button pushes and taps) from the user as sensed by user interface 1250.

In one example of operation, microcontroller 1202 display indication of an incoming call to cellular transceiver 1206 using peripheral vision device 1204. Upon noticing the displayed indication, the user nods to indicate that system 1200 should answer the call, whereupon microcontroller 1202 instructs cellular transceiver 1206 to answer the incoming call and allows the user to hear the caller via audio output device 1220 and speak to the caller via a microphone 1258.

System 1200 may also include one or more internal sensors 1210 that couple with microcontroller 1202 to sense performance of the user. The internal sensors 1210 may include one or more of an accelerometer, a gyroscope, a pressure sensor, a power sensor, a temperature sensor, a light sensor, GNSS (GPS), and a proximity sensor. Optionally, sensors of user interface 1250 and sensors 1210 may provide one or more of user input information, environmental information, and performance information. For example, information received from an accelerometer within sensors 1210 may also be interpreted provide user input information.

System 1200 may also include a interface 1230 coupled with microcontroller 1202 that enables communication between system 1200 and a PC or other device such as a tablet, a smart phone, a media player, and other similar devices. In one example of operation, a PC connected to interface 1230 is used to configure contact information and other operation parameters of system 1200 via a USB interface. Interface 1230 may also represent a wireless transceiver (e.g., Bluetooth or Bluetooth Low Energy) for communicating with the PC without departing from the scope hereof.

Figure 13:
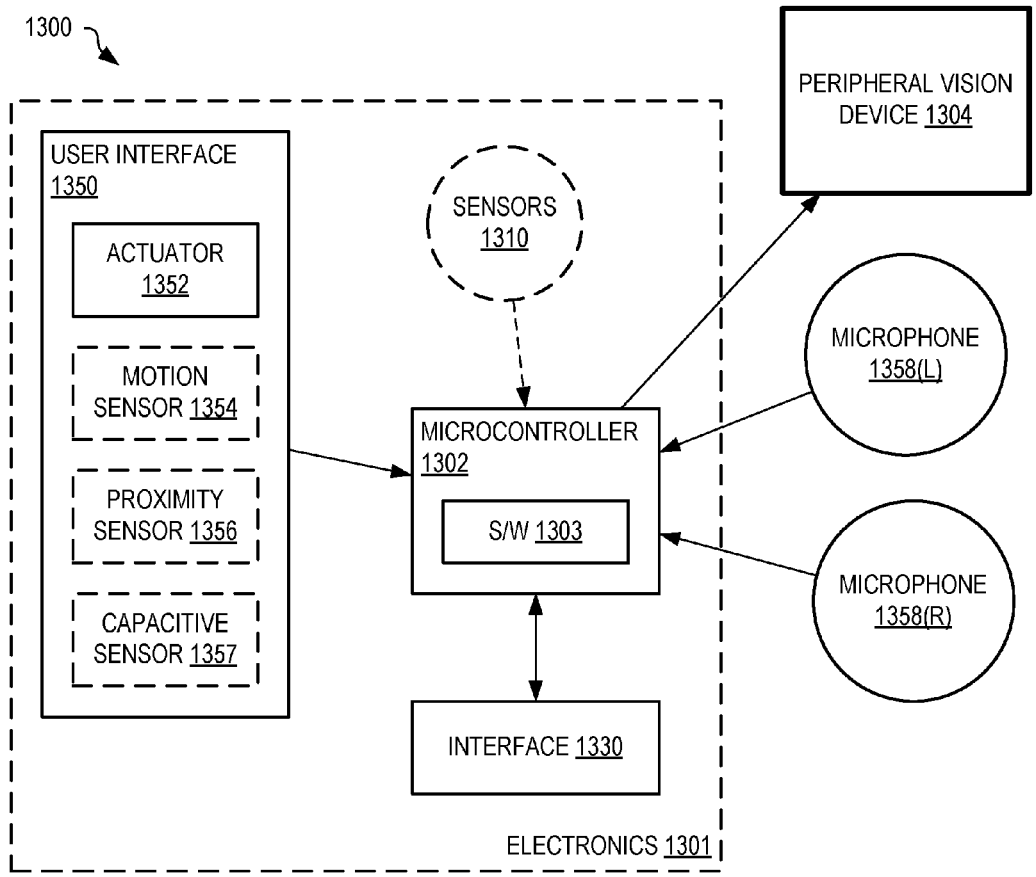
FIG. 13 shows one exemplary head mounted system for displaying sound indications within a peripheral vision area of a user of system, in an embodiment.

FIG. 13 shows one exemplary head mounted system 1300 for displaying sound indications within a peripheral vision area of a user of system 1300. System 1300 includes a microcontroller 1302, a peripheral vision device 1304, and may include a wireless transceiver (not shown) similar to transceiver 806. Microcontroller 1302 may include memory (non-volatile and volatile), one or more analog to digital converters, and other functionality, as typically found in microcontroller devices. Microcontroller 1302 is shown with software 1303, stored within a memory of microcontroller 1302 for example, which has machine readable instructions that when executed by microcontroller 1302 performs functionality of system 1300, as describe below.

Peripheral vision device 1304 is positioned within a peripheral vision area of a user of system 1300 and controlled by microcontroller 1302 to display an illumination pattern that indicates sounds detected by microphones 1358. Software 1303 includes one or more algorithms for processing data collected by microcontroller 1302 from microphones 1358 to identify one or more of: intensity, frequency, spectral content, and direction of the sound source.

System 1300 has a user interface 1350 for receiving input from the user. User interface 1350 may include one or more of: an actuator 1352, motion sensors 1354, a proximity sensor 1356, and a capacitive sensor 1357. Actuator 1352 represents an input device (e.g., a push button switch) that allows the user to interact with microcontroller 1302. In one embodiment, actuator 1352 is used to activate and deactivate system 1300. Motion sensor 1354 may include one or more accelerometers and/or gyroscopes for detecting movement of system 1300. Proximity sensor 1356 detects proximity changes of system 1300 relative to other objects (e.g., the user's hand). Capacitive sensor 1357 detects touch and/or motion of a user's fingertips on a surface proximate sensor 1357 as an input to system 1300. User interface 1350 allows system 1300 to recognize user gestures, such as: button pushes (long and/or short duration); taps—single, double, or triple taps by the user on system 1300; touches and/or finger movements along a surface of system 1300; and movements such as head tilts, and head nods and/or shakes. Microcontroller 1302 may also interpret combinations of inputs (e.g., button pushes and taps) from the user as sensed by user interface 1350. In one embodiment, one or more capacitive sensors 1357 are positioned proximate to light display elements of peripheral vision device 1304 such that gestures made by the user (e.g., sliding a finger) along the frame above a lit portion of peripheral vision device 1304 are input as commands to change one or more settings associated with the displayed metric.

System 1300 may include one or more sensors 1310 for sensing the environmental conditions, such as ambient light, body temperature, air temperature, and so on. Sensors 1310 are similar to sensors 110 of system 100, FIG. 1, for example.

System 1300 may also include an interface 1330 coupled with microcontroller 1302 that enables communication between system 1300 and one or more of a PC, a tablet, a smart phone, and other similar devices. In one example of operation, the PC is used to configure software 1303 and thresholds of system 1300 via a USB interface of interface 1330. Interface 1330 may also represent a wireless transceiver (e.g., Bluetooth or Bluetooth Low Energy) for communicating with the PC.

FIG. 14 is a perspective view showing system 1300 of FIG. 13 configured with frames 1402 of a pair of glasses. A plurality of light display elements 1410 are positioned within frames 1402 around both lenses to form peripheral vision device 1304 such that light display elements 1410 are within a peripheral vision area of the user when the glasses are worn. Although shown with thirteen light display elements 1410 on each half of frames 1402, system 1300 may have more of fewer light display elements without departing from the scope hereof. Light display elements 1410 may be positioned to form linear arrays 1412(L), 1412(R) such that level signals may be displayed (e.g., the number of light display elements illuminated within array 1412 indicates a level). Each light display element 1410 may be mono-color, bicolor, tricolor, or multi-color, such that additional information of a signal may be conveyed to the user. A housing 1406 formed on ear piece 1404 of frames 1402 contains electronics 1301 that include microcontroller 1302, user interface 1350, and optionally interface 1330. Housing 1406 may also include a battery (not shown) for powering electronics 1301 and peripheral vision device 1304. The battery may also be positioned elsewhere (e.g., within a separate housing on the other ear piece of the glasses) without departing from the scope hereof.

In one example of operation, microcontroller 1302 receives signals from microphones 1358(L) and 1358(R) and converts them into digital data streams using at least one analog to digital converter. These data streams are then processed by executing software 1303 to identify and qualify sounds within each data stream. In one example, software 1303 implements one or more of digital filters, fast Fourier transforms, and other digital signal processing algorithm in conjunction with correlation algorithms. Microcontroller 1302 correlates the digital data stream from each microphone 1358 to determine a direction of the sound relative to the position of the microphone and frames 1402, thereby deriving a direction relative to the user wearing the frames. Microcontroller 1302 then illuminates, flashes, and/or otherwise controls one or more light display elements 1410 of peripheral vision device 1304 to indicate a type of the sound, the intensity, and the direction. For example, arrays 1412(L) and 1412(R) may be used to indicate both intensity and direction of the sound, and other light display elements 1410 may indicate the type of the sound. For example, microcontroller 1302 executing software 1303 may identify one or more sounds from a phone ringing, a knock at the door, a doorbell, a fire alarm, a smoke alarm, a car horn, a baby monitor, a baby crying, a male voice, a female voice, and a child's voice.

System 1300 may also be configured with a wireless transceiver and an intermediary processor, similar to system 700 of FIG. 7, such that processing may be performed remotely and results transferred back to system 1300 for display using peripheral vision device 1304.

Figure 15A:
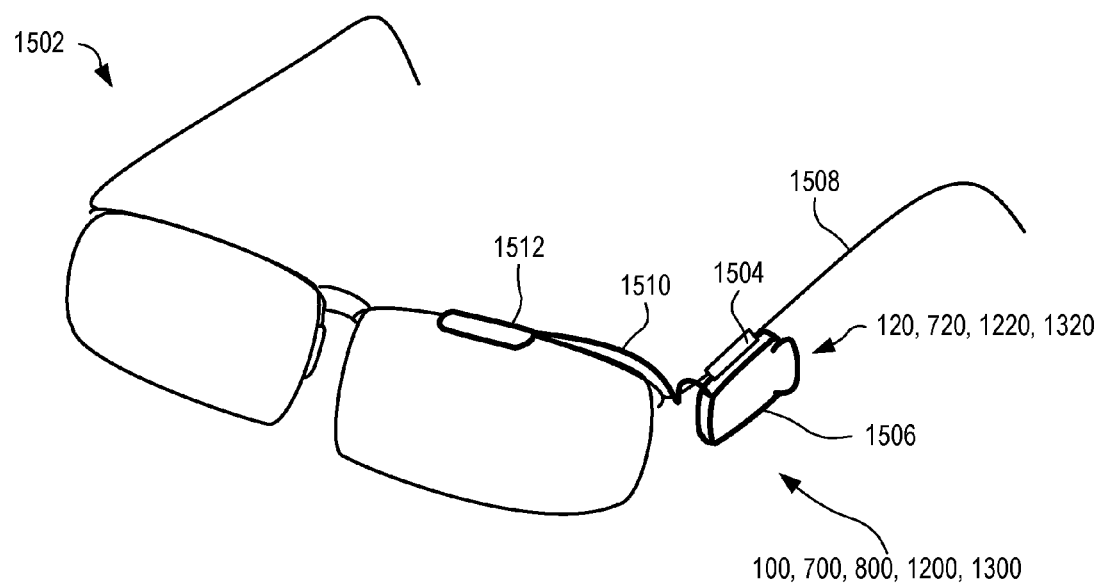
FIGS. 15A-C show perspective views of exemplary embodiments of the systems of FIGS. 1, 7, 8 and 12 configured as a clip-on addition to an ear piece of a user's existing glasses and sunglasses.
Figure 15B:
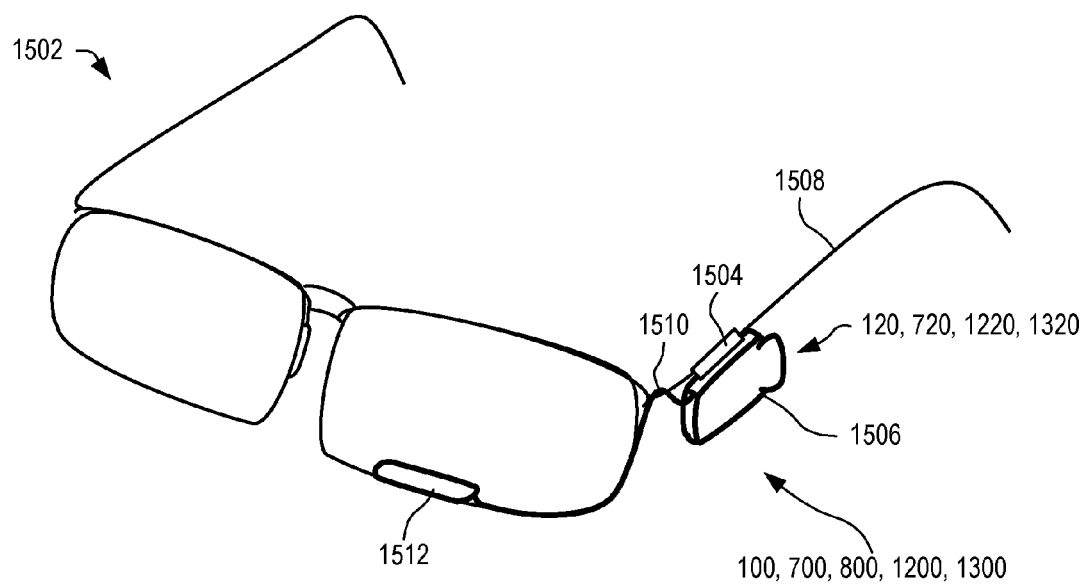
Figure 15C:
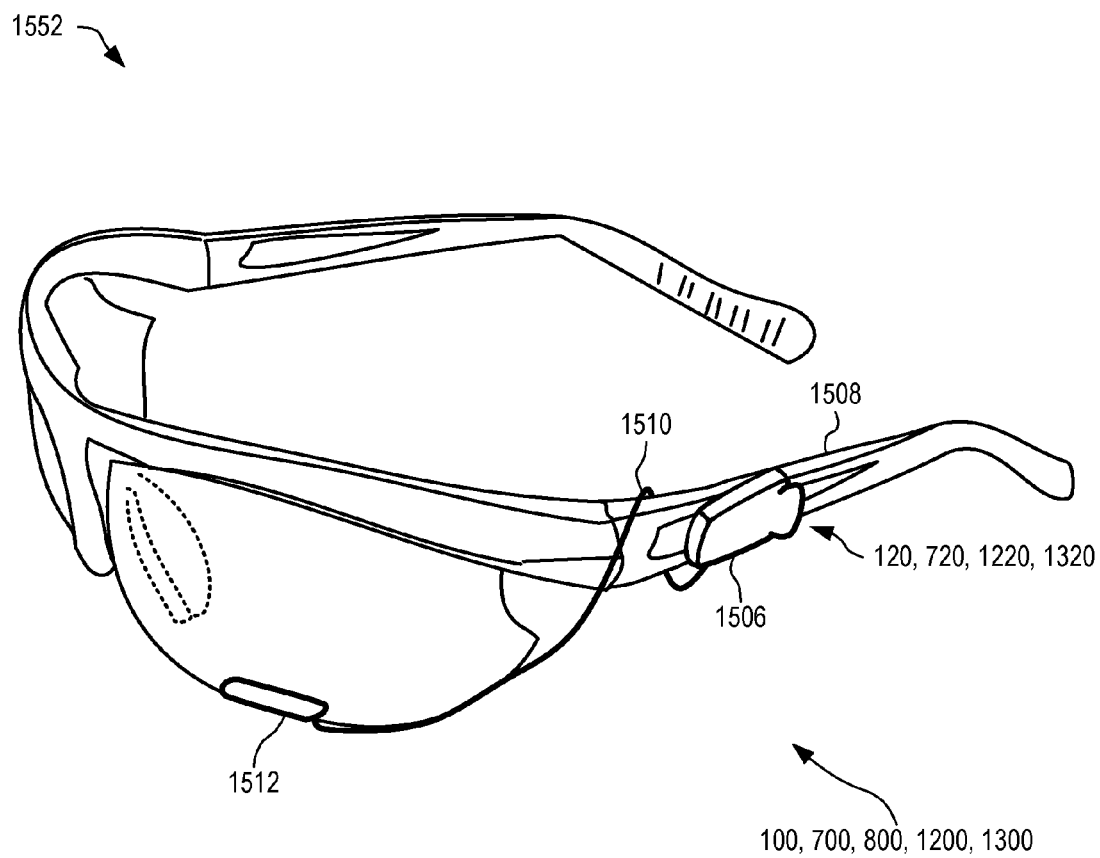

FIGS. 15A-C show perspective views of systems 100, 700, 800, 1200, and/or 1300 configured as a clip-on addition to an ear piece 1508 of a user's existing glasses 1502 and sunglasses 1552. An attachment device 1504 allows a housing 1506 to couple with ear piece 1508 of glasses 1502. Attachment device 1504 is for example similar to attachment mechanism 206 of FIG. 2. A peripheral vision device 1512 couples with housing 1506 containing electronics 101, 701, 801, 1201, 1302 of systems 100, 700, 800, 1200, and 1300, respectively. In one embodiment, peripheral vision device 1512 includes at least one lens that couples with electronics 101, 701, 801, 1201, and 1301 via at least one fiber optic connection 1510. For example, peripheral vision device 1512 may bond to glass or use an attachment feature such as suction cups for removable positioning. System 1500 may include more than one peripheral vision device 1512 without departing from the scope hereof. For example, peripheral vision devices 1512 may be positioned one or more of the top, the bottom, and the sides of a lens of the user's glasses.

Two systems may be worn together and/or integrated into one piece of headgear. For example, a first system 100 may be configured on a left side of a user's glasses, and a second system 100 may be configured on a right side of the user's glasses. The first and second systems then communicate and operate as a single, more capable unit. Displayed metrics and indications may be distributed between light display elements of both systems. For example, the first system 100 may display a low heart rate indication on a left-most light display element and the second system 100 may display a high heart rate indication on a right-most light display element. The first and second systems may also display different metrics and when information is uploaded to a PC (e.g., via interface 130), information is not duplicated from both units.

As described above, systems 100, 700, 800, 1200, and 1300 may implement a communication protocol that allows two or more units to communicate with one another as well as to communicate with external sensors 170a-c/740, intermediary processor 770, and signaling device 870. In one example, systems 100, 700, 800, 1200 and 1300 include transceivers that allow communication based upon ANT communication protocols. Other examples of communication devices and protocols that may be implemented and/or used with systems 100, 700, 800, 1200, and 1300 include BTLE and other Bluetooth (BT) communication devices and protocols. Systems 100, 700, 800, 1200, and 1300 may be configures to use any appropriate type of communication device and protocol without departing from the scope hereof.

Positioning of peripheral vision devices 104, 704, 804, 1204, and 1304, as described above, may also use other means to enhance reliability and convenience. For example, boom 202 may include one or more of a suction cup and an adhesive pad, for attaching boom 202 to a user's goggles or glasses. In another example, boom 202 includes an attachment clip that allows boom 202 to attach to items (e.g., glasses, goggles, face protectors, headgear, and so on.) worn by the user.

Additional Examples of Use

In a retail environment, serving staff each wear systems 800 to receive instructions to better service customers. For example, one or more light display elements of system 800 may be assigned to indicate a location where more servers are required to help customers. In another example, a server in a restaurant wears system 800 and one or more light display elements are assigned to indicate that food is ready. In another example, system 800 is worn by a kitchen worker and one or more indicators are assigned to indicate that more food of a particular type (e.g., hamburger) should be prepared. System 800 may be used to convey information where speaking directly to people is not convenient.

In another example, system 100 includes a GPS receiver and mapping information of a golf course, such that system 100 may provide distance information of a current position to a next green when worn by a golfer. In another example, system 700 is linked to a GPS unit in a golf cart to provide distance information as received wirelessly. One or more user inputs may instruct system 100, 700 as to when to switch to the next hole and to keep track of strokes taken.

In another example of use, system 800 may be configured to provide timing prompts, such as a time-per-question reminder for a student in an exam. In another example, system 800 provides prompts to a teacher (or other officiator) from members of the class without disturbing other members of the class.

In another example, system 800 is worn by sound engineers at a concert, and linear arrays 912 are used to visually display the DB's (since the engineers typically wear noise cancelling headphones). Similarly, for worker of heavy equipment where audible warnings are less effective, system 800 may be worn to provide one or more alarm and/or status indications.

In a gaming environment, a player wears system 800 in the embodiment of frames 902 to display one or more of kill and hit rates in laser tag. For example, linear array 912 may indicate one or more of: a "health" of the player in the game, an amount of ammunition left, and time left in the game.

In another example, a cyclist wears system 100 to view their current performance and to communicate with other cyclists in a peloton. For example, when the front rider needs to switch out, he may utilize the user interface of system 100 to indicate to other riders in the peloton one or more of: he is about to change out of the lead position, he has equipment problems, and he is going into attack mode. Through use of system 100, each member of the team is aware of the required actions at the same time.

In another example, system 800 couples to a cell phone and displays indication of incoming calls, incoming text messages, and incoming emails. System 800 may thus operate similar to system 1200, but with an external cell phone.

In another example of use, system 800 is coupled with a GPS receiver and provides an indication of a required direction change based upon the user's location and movement. For example, system 800 may indicate a left turn, a right turn, straight ahead, and may display compass information to the user. In another example, system 800 provides clues within a treasure hunt, such as getting closer to and farther from the goal.

In another example of use, system 800 provides status indications from a laptop, tablet computer (e.g., Apple iPad™) and desktop computer, such as instant messaging and email notifications, without requiring the user to switch to different displays on the computer.

In another example of use, a driver wears system 800 while driving a car to provide a warning indication (e.g., car malfunction). For example, system 800 may also indicate backup warnings and/or distances, and may include a range finder to display measured distances to the user, for example to warn if travelling too close to the vehicle in front.

In another example of use, each of a plurality of cyclists wear system 100 to display their performance information, and to also receive indication of acceleration/deceleration of the other riders (i.e., system 100 acts as a bicycle brake light). That is, within an ecosystem of cycle riders each wearing at least one system 100, certain information may be shared between the riders to enhance safety and promote awareness of intended activities.

In another example of use, system 700 communicates with an iPhone® to receive performance data from at least one sensor (internal and/or external) and display high level data using peripheral vision device 804, while sending the data to the iPhone to allow the data to be stored and/or displayed graphically.

In another example of use, within a manufacturing environment, equipment operators wear system 800 in the form of a pair of safety glasses, as shown in FIG. 9, to display status information of operated equipment. For example, one or more light display elements may be assigned to indicate that the operator should increase or decrease speed, or that an item has passed inspection or failed inspection. A plant manager may walk through a division wearing system 800, and based upon connectivity (e.g., automatically connecting to systems within proximity) may receive an instant display of operation status.

In another example of use, system 100 is included within a helmet of a football player to indicate selected plays and his performance during training. System 100 may include a GPS receiver and thus indicate when the player should turn and cut for a selected or predefined play.

In another example of use, system 100 is built into goggles and/or a helmet worn by a parachutist and used to indicate when the rip-cord should be pulled, or may be used to provide an indication of danger.

In another example of use, system 800 is worn by a pilot and is in communication with aircraft equipment to provide a status display (e.g., warning lights) and/or other information. In another example, system 800 couples with one or more gyroscopes mounted within the aircraft to generate an artificial horizon, wherein system 800 displays attitude information of the aircraft to the pilot.

In another example of use, external sensors (e.g., one or more accelerometers) are attached to a head of a golf club swung by a wearer of system 100. As the user swings the club, microcontroller 102 determines a club head speed, which is reported to the user, either visually using peripheral vision device 104 and/or audibly via audio output device 120. Additional sensors (e.g., sensors 110) may be integrated into the grips of the club, such that system 100 may optionally display the user's grip pressure.

In another example of use, system 100 is configured within swim goggles to maintain a lap counter and other performance measurements. System 100 may include a heart rate monitor sensor (e.g., an ear clip) and one or more accelerometers and/or gyroscopes that allow microcontroller to determine a swim direction, and thereby count laps.

In another example, system 700 includes two-way voice communication to other similarly enables systems. For example, cyclists in a peloton each using system 700 may communicate verbally over short distances, and may use verbal commands to control system 700.

In another example of use, system 100, 700 has one or more sensors positioned on an arm or a leg of the user, wherein system 100, 700 displays an indication of body position relative to a set position as used for working out with weights and other equipment. System 100, 700 may then count repetitions of a set of exercises, and even count the number of sets. Where system 100, 700 is preprogrammed with the exercises and total number of sets, system 100, 700 may prompt (either visually and/or audibly) the user as to which exercise/set is next, and how many repetitions/sets/exercises are remaining. System 100, 700 may also interact with another device (e.g., a cell phone, iPod etc.) to display exercises and/or statistics, and receive configuration information as to the number of repetitions, target heart rate, training intervals, etc. After exercising, system 100, 700 may download data to the device for display to the user and/or uploading to a web site for storage and/or comparison with other competitors.

In another embodiment, an automatic wireless cycle brake light system utilizes accelerometers to detect acceleration and/or other methods of detecting changes in motion to control a tail light that varies in intensity and/or color to indicate changes in speed of the cycle. For example, when the user coasts, the light may be yellow, whereas when the user brakes, a high intensity red light is displayed.

In another example of use, a stock broker may configure system 800 to provide an alert when a stock value (or commodity or market index) drops below, or exceeds, a lower or upper threshold.

In another example of use, an external level sensing device includes at least one accelerometer sensor (e.g., one of sensors 170a-c), and sends wireless level information to system 100. A user wears system 100, which displays the level information from the external device, thereby allowing the user to level equipment for example without constantly referring to the level sensing device itself.

Figure 16A:
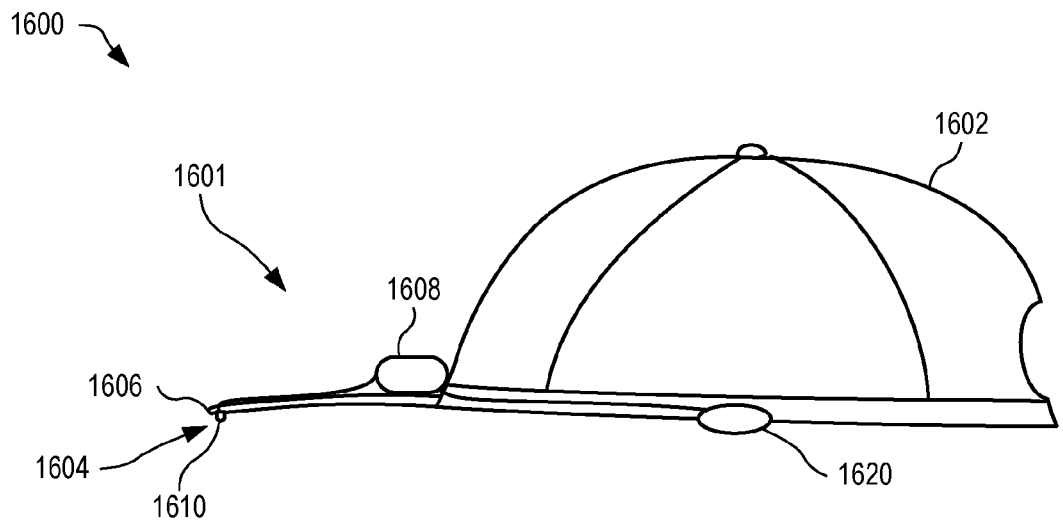
FIGS. 16A and B show one exemplary head-mounted peripheral vision display system configured as a baseball cap, in an embodiment.
Figure 16B:
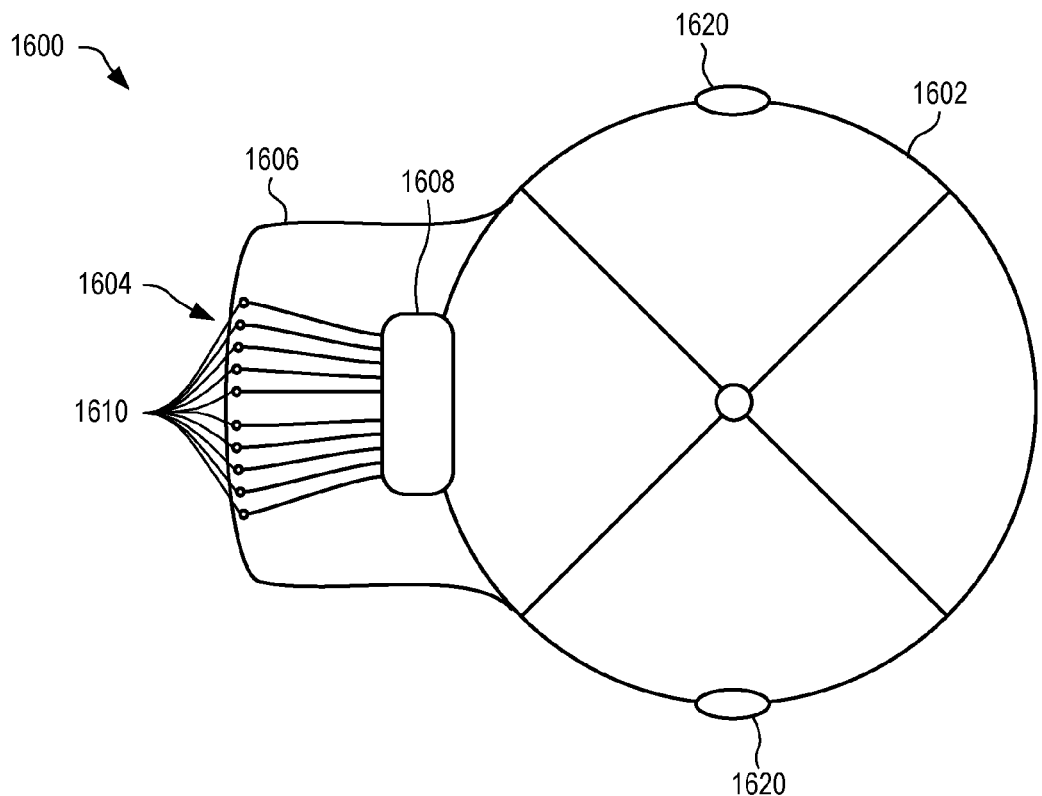

FIGS. 16A and B show one exemplary head-mounted peripheral vision display system 1600 integrated with a baseball cap 1602. System 1600 may represent one of systems 100, 700, 800, 1200, and 1300 of FIGS. 1, 7, 8, 12 and 30, respectively. A peripheral vision device 1604 is positioned to be able to emit light from an underside of a peak 1606 of baseball cap 1602 and a housing 1608 is positioned on a top surface of peak 1606 and contains electronics of system 1600. Housing 1608 may be positioned or integrated elsewhere on or within cap 1602 without departing from the scope hereof. Each light display element 1610 of peripheral vision device 1604 is electrically coupled with electronics within housing 1608. Optionally, one or more audio output devices 1620 are integrated with baseball cap 1602 to provide audio output from system 1600. Audio output devices 1620 may represent audio output devices 120, 720, 820, 1220, and 1320, for example. Systems 100, 700, 800, 1200, and 1300 may similarly be configured to attach to existing headwear or may be integrated with headwear. For example, systems 100, 700, 800, 1200, and 1300 may be integrated with a helmet, a hat, glasses, headphones, earphones, and other items worn or used on the head. Systems 100, 700, 800, 1200, and 1300 may for example be formed with an attachment mechanism for coupling within or upon one or more of a helmet, a hat, glasses, headphones, earphones, and other items worn or used on the head.

Figure 17:
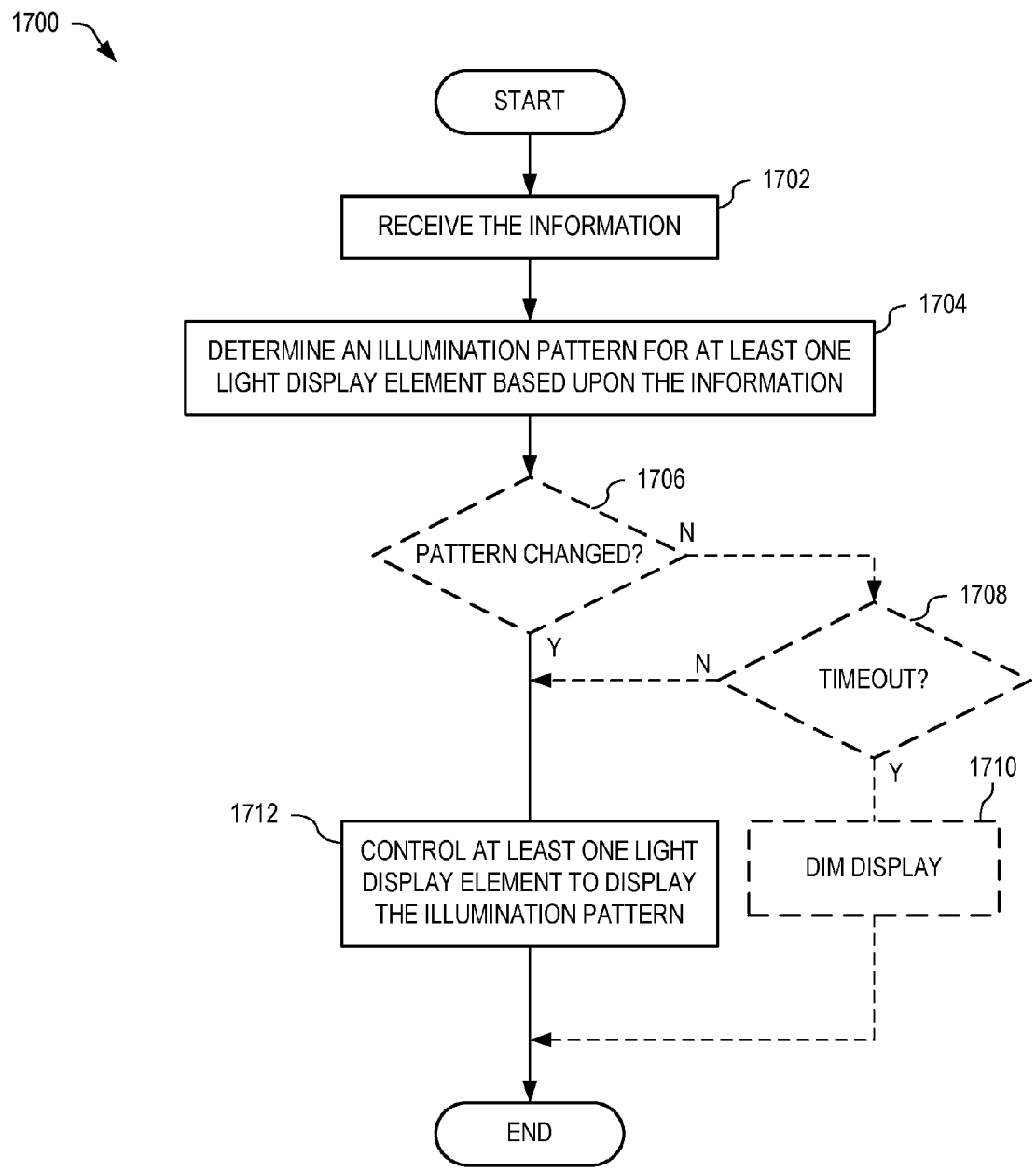
FIG. 17 is a flowchart illustrating one exemplary method for displaying information to a user without distraction, in an embodiment.

FIG. 17 is a flowchart illustrating one exemplary method 1700 for displaying information to a user without distraction. Method 1700 is for example implemented within one or more of software 103, software 703, software 803, software 1203, and software 1303, of systems 100, 700, 800, 1200, and 1300, respectively.

In step 1702, method 1700 receives the information. In one example of step 1702, wireless receiver/transceiver 106 receives information from one or more external sensors or devices and passes the information to microcontroller 102. In step 1704, method 1700 determines an illumination pattern for at least one light display element based upon the information. In one example of step 1704, microcontroller 102 determines illumination pattern 408 for light display elements 304 based upon information received from sensors 170a-c.

Steps 1706 through 1710 are optional. If included, step 1706 is a decision. If, in step 1706, method 1700 determines that the determined illumination pattern has changed, method 1700 continues with step 1712; otherwise method 1700 continues with step 1708. If included, step 1708 is a decision. If, in step 1708m method 1700 determines that a timeout has occurred, method 1700 continues with step 1710; otherwise method 1700 terminates. In one example of step 1708, a timer within microcontroller 102, 702, 802, 1202, and 1302, is configured to mature a predefined period after a pattern change in peripheral vision device 104, 704, 804, 1204, and 1304, where the timer is restarted whenever the pattern in the peripheral vision device changes. If included, in step 1710, method 1700 dims (or extinguishes) the peripheral vision device. In one example of step 1710, peripheral vision device 104, 704, 804, 1204, and 1304 is gradually dimmed and then extinguished by microcontroller 102, 702, 802, 1202, and 1302.

In step 1712, method 1700 controls the at least one light display element to display the illumination pattern. In one example of step 1712, microcontroller 102 controls light display elements 304 to display illumination pattern 408 determined from information received from wireless receiver/transceiver 106. Where steps 1706 through 1710 are included, step 1712 may also restart the timer within microcontroller 102, 702, 802, 1202, and 1302.

Figure 18:
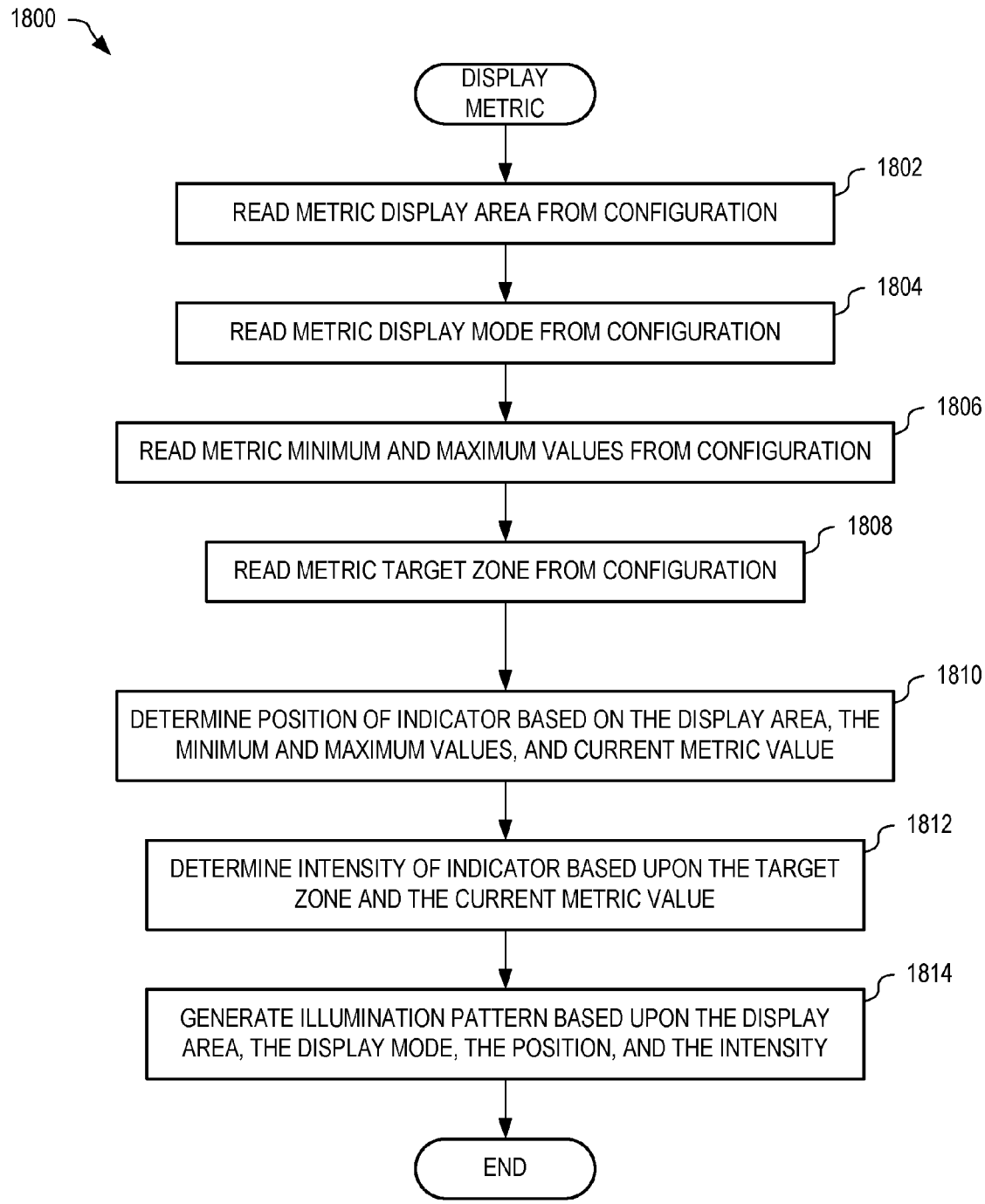
FIG. 18 is a flowchart illustrating one exemplary method for determining an illumination pattern for one metric, in an embodiment.

FIG. 18 is a flowchart illustrating one exemplary method 1800 for determining an illumination pattern for one metric. Method 1800 may represent at least part of step 1704 of FIG. 17 and is for example implemented within one or more of software 103, software 703, software 803, software 1203, and software 1303, of systems 100, 700, 800, 1200, and 1300, respectively.

In step 1802, method 1800 reads a metric display area from a configuration. In one example of step 1802, microcontroller 102 reads a display area containing display elements 304(1) through 304(7) from configuration 160 for activity metric 406. In step 1804, method 1800 reads a display mode from the configuration for the metric. In one example of step 1804, microcontroller 102 reads a display mode indicating that activity metric 406 is displayed as a linear array. In step 1806, method 1800 reads metric minimum and maximum values from the configuration. In one example of step 1806, microcontroller 102 reads, for a running metric, a minimum value of 2 miles per hour (mph) and a maximum value of 8 mph. In step 1808, method 1800 reads a metric target zone from the configuration. In one example of step 1808, microcontroller 102 reads, for the running metric, a target zone of 4-6 mph.

In step 1810, method 1800 determines a position of indicator based on the minimum and maximum values and the current metric value. In one example of step 1810, continuing with the above running example where the current metric value is 5 mph, microcontroller 102 determines that light display element 304(4) is the position for indicating the current metric value for activity metric 406 based upon the display area of light display elements 304(1)-(7), the minimum and maximum values of 2 mph and 8 mph, and the current metric value of 5 mph.

In step 1812, method 1800 determines an intensity of the illumination pattern based upon the target zone and the current metric value. In one example of step 1812, microcontroller 102 determines that the current metric value is within the target zone of step 1808 and therefore sets illumination pattern 408 to have a bright flashing intensity. In step 1814, method 1800 generates an illumination pattern based upon the display area, the display mode, the position, and the intensity. In one example of step 1814, microcontroller 102 generates illumination pattern 408 to display active metric 406 on peripheral vision device 104.

Ordering of steps within method 1800 may change without departing from the scope hereof.

Figure 19:
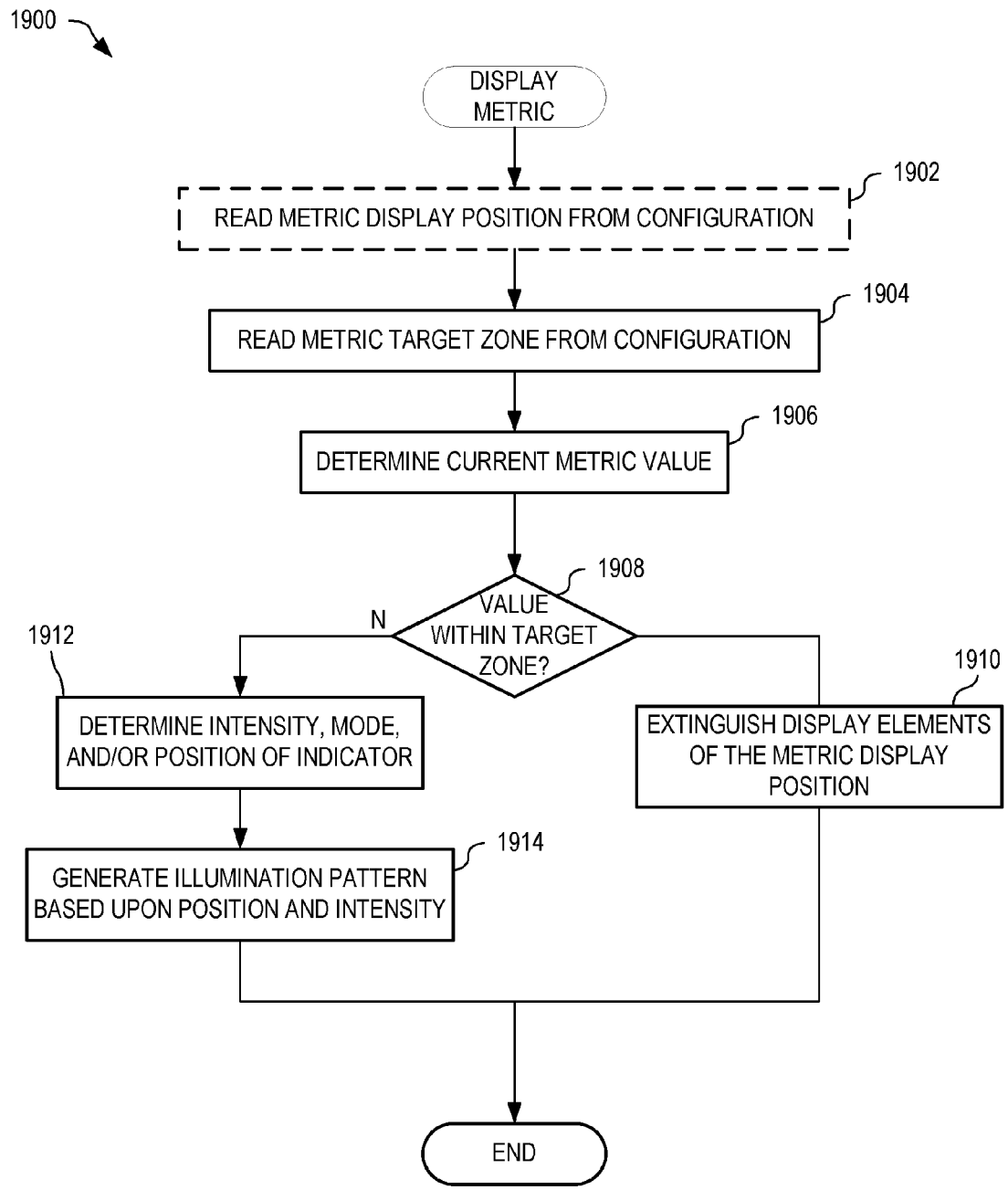
FIG. 19 is a flowchart illustrating one exemplary method for determining an illumination pattern for an activity metric where activity in a target zone is indicated by no illuminated elements of the peripheral display.

FIG. 19 is a flowchart illustrating one exemplary method 1900 for determining an illumination pattern for an activity metric where activity in a target zone is indicated by no illuminated elements of the peripheral display. Method 1900 may represent at least part of step 1704 of FIG. 17 and is for example implemented within one or more of software 103, software 703, software 803, software 1203, and software 1303, of systems 100, 700, 800, 1200, and 1300, respectively.

Step 1902 is optional. Step 1902 is included where the peripheral display has multiple light display elements 304. In step 1902, method 1900 reads metric display position from the configuration. In one example of step 1902, microcontroller 102 reads a display area containing display elements 304(1) through 304(7) from configuration 160 for activity metric 406. In step 1904, method 1900 reads a metric target zone from the configuration. In one example of step 1904, microcontroller 102 reads a 4-6 mph target zone from configuration 160. In step 1906, method 1900 determines a current metric value. In one example of step 1906, microcontroller 102 processes information received from one or more sensors 110 and/or 154 to determine a current running speed of the user as the current metric value.

Step 1908 is a decision. If, in step 1908, method 1900 determines that the current metric value is within the target zone, method 1900 continues with step 1910; otherwise method 1900 continues with step 1912. In step 1910, method 1900 extinguishes the display elements of the metric display position. In one example of step 1910, microcontroller 102 controls peripheral vision device 104 to extinguish light display elements 304(1)-(7) of activity metric 406. Method 1900 then terminates.

In step 1912, method 1900 determines intensity, a mode, and/or a position of indicators for illumination based upon the current metric value, the display position, and the target zone. In one example of step 1912, microcontroller 102 determines intensity based upon the size of the difference between the current metric value and the target zone. In step 1914, method 1900 generates an illumination pattern based upon the position and the intensity. In one example of step 1914, microcontroller 102 generates illumination pattern 408 to display active metric 406 on peripheral vision device 104.

Ordering of steps within method 1900 may change without departing from the scope hereof.

Figure 20:
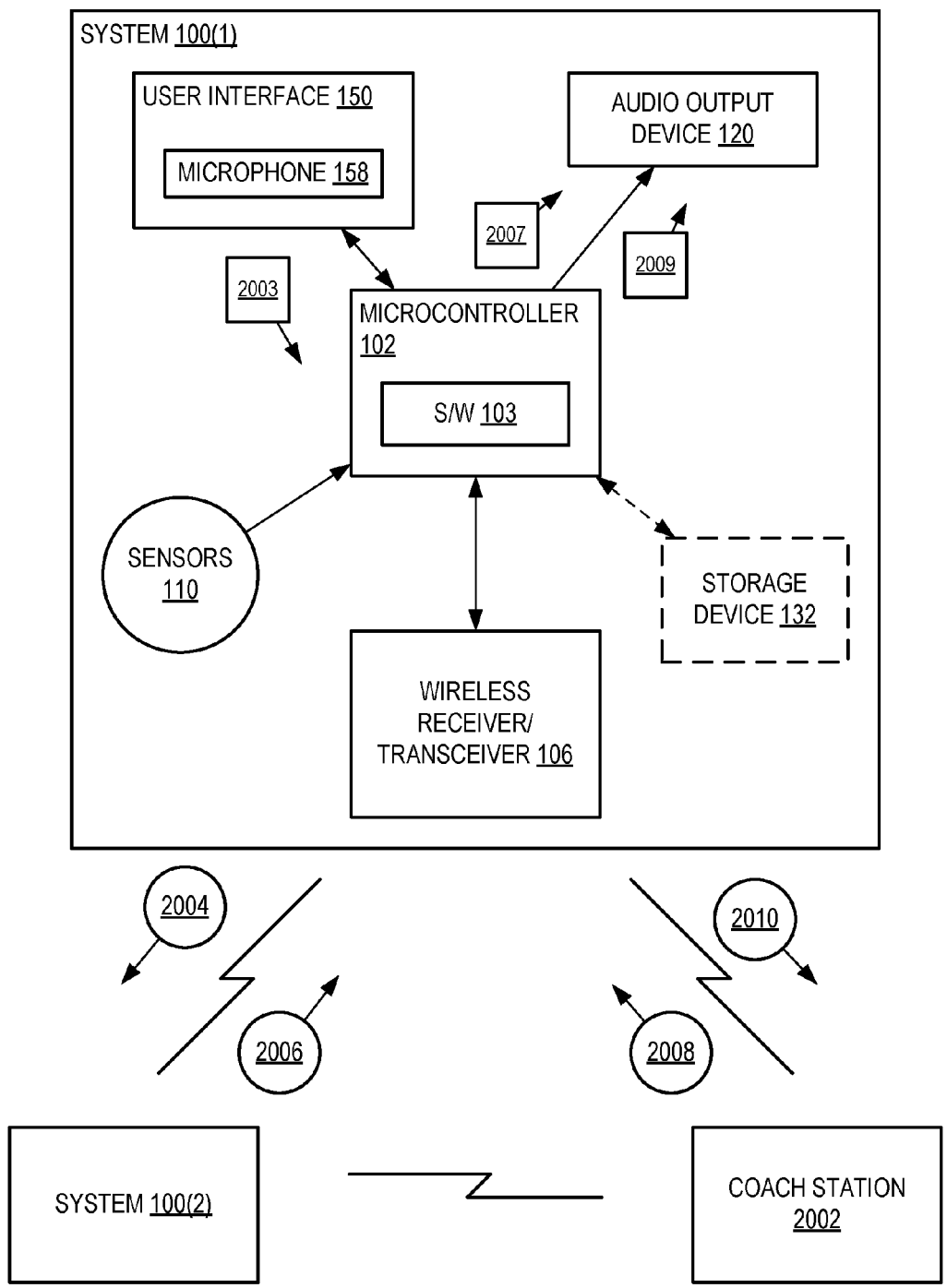
FIG. 20 shows exemplary communication between two head-mounted performance display systems, and between a coach station 2002 and each of the two head-mounted performance display systems, in an embodiment.

FIG. 20 shows exemplary communication between head-mounted performance display systems 100(1) and 100(2), and between a coach station 2002 and each of systems 100(1) and 100(2). Although the example uses system 100, any of systems 100, 700, 800, 1200, and 1300 may be used without departing from the scope hereof. System 100(1) and system 100(2) communicate with each other and communicate with coach station 2002 wirelessly using wireless receiver/transceiver 106. Coach station 2002 has a transceiver similar to (or compatible with) wireless receiver/transceiver 106 and includes a microphone (e.g., similar to microphone 158 of system 100) and an audio output device (e.g., similar to audio output device 120).

In one example of operation, an analog signal 2003 generated by microphone 158 is captured by microcontroller 102 (e.g., using an analog to digital converter controlled by software 103) and transferred to wireless receiver/transceiver 106 for transmission as wireless signal 2004 to system 100(2). Within system 100(2), information received within wireless signal 2004 is output to the user of system 100(2) using audio output device 120 of system 100(2). Similarly, system 100(2) may capture audio from the user and send that audio within wireless signal 2006 to system 100(1), where it is received by wireless receiver/transceiver 106 and transferred by microcontroller 102 to audio output device 120 for output to the user of system 100(1). Thus, users of systems 100(1) and 100(2) may communicate using voice.

In one embodiment, systems 100(1) and 100(2) communicate with one another via wireless receiver/transceiver 106 to share route profiles and/or synchronize route profiles. For example, where users meet at to start a run together, system 100(1) of a first user and system 100(2) of a second user may synchronize to share a preconfigured route programmed into system 100(1). In another example, the first and second users may synchronize target zones (e.g., running speed) where they intend to run together.

Similarly, coach station 2002 may send a wireless signal 2008 containing audio information (e.g., voice) from a user (e.g., coach) of coach station 2002 which is transferred by microcontroller 102 as data 2009 for output by audio output device 120 of system 100(1) to the user of system 100(1).

Coach station 2002 may also receive wireless performance information 2010 from system 100(1) as determined by microcontroller 102 from one or more sensors 110. Thus, coach station 2002 may display real-time performance data of the user of system 100(1) and also provide audio feedback to that user.

In one example of operation, coach station 2002 operates within a group/social setting (e.g., a training class such as spinning, aerobics, Pilates or other) to instantly change the profiles of each of a plurality of head-mounted peripheral display systems (e.g., systems 100, 700, 800, 1200, and 1300). For example, coach station 2002 may transition a plurality of systems 100, 700, 800, 1200, and 1300 that are assigned to a group, between stages in a workout wherein the desired metric is automatically changed for all systems in the group.

Combinations of Features

It should be clear to one skilled in the art that the above-mentioned features, and others, may be combined in embodiments of head-mounted displays. The following combinations of features are contemplated:

- A. A head-mounted display for displaying information to a user without distraction, including at least one light display element positioned within a peripheral vision area of at least one eye of the user. The information is imparted to the user without the need of repositioning or refocusing the eye. The display also includes a receiver for receiving the information, and a microcontroller coupled with the receiver and the at least one light display element. The microcontroller processes the information to determine an illumination pattern based upon the information and for controlling the at least one light display element to display the illumination pattern.
- B. The display denoted above as A, further including a boom for positioning the at least one light display element within the peripheral vision area.
- C. The display denoted above as A or B, with a boom that includes a flexible substrate having position memory to allow the user to position the at least one light display element relative to the eye.
- D. The display denoted above as A, B or C, further including an attachment feature integrated with the boom for securing the boom to one of eyewear and headwear of the user.
- E. The display denoted above as A, B, C or D, further including a mounting clip for physically coupling the boom onto an item worn on a head of the user.
- F. The display denoted above as any of A through E, with a mounting clip that is configured to physically couple with one or more of: regular glasses, sun glasses, goggles, a face mask, a hat, a strap fastened around the head of the user, a visor, a cap, a helmet, and a carrier formed to support the head-mounted performance display and worn by the user.
- G. The display denoted above as any of A through F, with a boom and a housing coupled with the boom for containing the receiver and the microcontroller.
- H. The display denoted above as any of A through G, further including a user interface for interacting with the user and including an actuator for allowing the user to activate and deactivate the head-mounted display.
- I. The display denoted above as any of A through H, including a user interface that includes one or more of an accelerometer for detecting movement of the head-mounted display, a proximity sensor for detecting proximity of a hand of the user, a capacitive sensor for detecting a touch of a finger of the user, and a microphone for detecting sounds from the user.
- J. The display denoted above as any of A through I, further including at least one sensor electrically coupled to the microcontroller for sensing activity of the user, wherein the microcontroller determines the information based at least in part upon the activity.
- K. The display denoted above as any of A through J, including at least one sensor that is one or more of a heart rate monitor, a speed sensor, an accelerometer, a gyroscope, a pressure sensor, and a power sensor.
- L. The display denoted above as any of A through J, including at least one sensor that is a temperature sensor for sensing ambient temperature.
- M. The display denoted above as any of A through L, including at least one light sensor for detecting an ambient light level, wherein the microcontroller automatically adjust an intensity of the at least one light display element based upon the ambient light level.
- N. The display denoted above as any of A through M, the microcontroller processing a signal from an accelerometer to detect user input in the form of taps to the display or a head shake of the user.
- O. The display denoted above as any of A through N, the receiver configured to receive the information from one or more of a bike computer, an exercise equipment computer, and a motor vehicle computer.
- P. The display denoted above as any of A through O, the receiver configured to receive the information from an exercise equipment computer, wherein exercise equipment that includes the exercise equipment computer includes one of a stationary bike, a treadmill, and an elliptical machine.
- Q. The display denoted above as any of A through P, further including a GNSS receiver coupled with the microcontroller, the microcontroller determining one or more of speed and distance from the GNSS receiver.
- R. The display denoted above as any of A through Q, the receiver including a wireless receiver for receiving the information wirelessly.
- S. The display denoted above as any of A through R, the at least one light display element including a plurality of light display element formed as a linear array of light display elements that are independently controlled.

T. A method for displaying information to a user without distraction, including the steps of receiving the information within a microcontroller of a peripheral vision display system, and determining, within the microcontroller, an illumination pattern for at least one light display element based upon the information. The method further includes controlling the at least one light display element to display the illumination pattern wherein the at least one light display element is positioned within an area of peripheral vision of at least one eye of the user such that the information may be imparted to the user without the need to reposition or refocus the eye.

U. The method denoted above as T, the step of receiving including receiving data from one or more sensors within the microcontroller, and processing the data to generate the information.

V. The method denoted above as T or U, the step of receiving including receiving the information from a signaling device.

W. The method denoted above as T, U or V, further including sensing an ambient light level and adjusting an intensity of illuminated light display elements based upon the ambient light level.

X. A headset for displaying information within a peripheral vision area of a user, including a receiver for receiving a signal from a signaling device, and at least one light display element positioned within a peripheral vision area of at least one eye of the user such that the information is imparted to the user without the need of repositioning or refocusing the eye. The headset further includes a microcontroller coupled with the receiver and the at least one light display element for determining an illumination pattern based upon the signal and for controlling the at least one light display element to display the illumination pattern.

Y. The headset denoted above as X, further including a boom for positioning the at least one light display element within the peripheral vision area.

Z. The headset denoted above as X or Y, further including a mounting clip for attaching the headset onto headgear worn by the user.

AA. The headset denoted above as X, Y or Z, further including a motion sensor for detecting motion of the headset, wherein the microcontroller determines user input based upon the motion.

AB. The headset denoted above as X, Y, Z or AA, the microcontroller selecting one of a plurality of display modes based upon the user input AC. The headset denoted above as any of X through AB, the receiver comprising a transceiver, wherein the microcontroller sends the user input to the signaling device via the transceiver.

AD. The headset denoted above as any of X through AC, the microcontroller interpreting detected motion resulting from the user nodding as an affirmative signal, and interpreting motion resulting from a head shake of the user as a negative signal.

AE. The headset denoted above as any of X through AD, including a motion sensor that is one or more of an accelerometer and a gyroscope, for detecting motion of the headset, AF. A system for displaying audio information within a peripheral vision area of a user, including at least one microphone for detecting sound, at least one light display element positioned within a peripheral vision area of at least one eye of the user such that the audio information is imparted to the user without the need of repositioning or refocusing the eye, and a microcontroller. The microcontroller is coupled with the at least one microphone and the at least one light display element, and includes machine readable instructions that when executed by the microcontroller perform the steps of processing the sound to generate the audio information, generating an illumination pattern based upon the sound, and controlling the at least one light display element to display the illumination pattern.

AG. The system denoted above as AF, the at least one microphone comprising at least two microphones for detecting stereo sounds, wherein the microcontroller processes the stereo sounds to generate at least two illumination patterns, one for each of the stereo sounds, and controls at least two light display elements to each display a different one of the illumination patterns.

AH. The system denoted above as AF or AG, the at least one microphone comprising at least two directional microphones, wherein the microcontroller determines directionality of the sound and generates the illumination pattern to indicate the directionality.

AI. Headwear for displaying information within a peripheral vision area of a user, including a receiver integrated with the headwear for receiving a signal that represents the information, at least one light display element integrated with the headwear and positioned within a peripheral vision area of at least one eye of the user; and a microcontroller. The microcontroller determines an illumination pattern based upon the signal and for controlling the at least one light display element to display the illumination pattern wherein the information is imparted to the user without the need of repositioning or refocusing the eye.

AJ. Headwear denoted above as AI, further including a boom for positioning the at least one light display element within the peripheral vision area.

AK. Headwear denoted above as AI or AJ wherein the headwear is selected from the group consisting of a helmet, a baseball cap, headphones, sunglasses, reading glasses, prescription glasses, ski goggles, swimming goggles, and a face mask.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A peripheral vision head-mounted display system for imparting information to a user without distraction, comprising:
    a flexible boom;
    at least one light display element located proximate a distal end of the flexible boom, wherein the flexible boom is configured to position the at least one light display element to direct non-reflected illumination into peripheral vision of the user's eye such that a non-textual illumination pattern is visually imparted to the user without repositioning or refocusing, the at least one light display element comprising a plurality of light display elements formed as a linear one-dimensional array, a subject light display element of the plurality of light display elements configured to emit light at a fixed wavelength based upon a position of the subject light display element; and a microcontroller coupled with the light display element for processing information from one or more sensors to determine the illumination pattern based upon the information and for controlling the light display element to display the illumination pattern.

2. The display of claim 1, the flexible boom comprising a flexible substrate having position memory to allow the user to position the light display element relative to the user's eye.

3. The display of claim 2, further comprising an attachment feature integrated with the flexible boom for securing the boom to one of eyewear and headwear of the user.

4. The display of claim 1, further comprising a mounting clip for physically coupling the flexible boom onto an item worn on a head of the user.

5. The display of claim 1, further comprising one or more of an accelerometer for detecting movement of the peripheral vision head-mounted display system, a proximity sensor for detecting proximity of a hand of the user, a capacitive sensor for detecting a touch of a finger of the user, and a microphone for detecting sounds from the user.

6. The display of claim 1, further comprising a receiver configured to receive the information from the sensors selected from the group including: bike computer, exercise equipment computer, and motor vehicle computer.

7. The display of claim 6, wherein exercise equipment, including the exercise equipment computer, comprises one of a stationary bike, a treadmill, and an elliptical machine.

8. The display of claim 6, the receiver comprising a GNSS receiver, and wherein the information comprises one or both of speed and distance.

9. The display of claim 6, the receiver comprising a wireless receiver for receiving the information wirelessly.

10. The display of claim 1, wherein the sensors comprise a microphone for detecting sound, and wherein the illumination pattern is based upon the sound.

11. A method for imparting information to a user without distraction, comprising the steps of:

receiving the information within a microcontroller of a peripheral vision head-mounted display system having at least one light display element located proximate a distal end of a flexible boom;

determining, within the microcontroller, a non-textual illumination pattern for the light display element based upon the information; and controlling the light display element to illuminate peripheral vision of an eye of the user with the illumination pattern without reflection;

wherein the flexible boom positions the at least one light display element to illuminate the non-textual illumination pattern onto the peripheral vision of the eye, the at least one light display element comprising a plurality of light display elements formed as a linear one-dimensional array, a subject light display element of the plurality of light display elements configured to emit light at a fixed wavelength based upon a position of the subject light display element.

12. The method of claim 11, the step of receiving comprising:

receiving, within the microcontroller, data from one or more sensors; and processing the data to generate the information.

13. The method of claim 11, further comprising sensing ambient light level and adjusting intensity of illuminated light display elements based upon the ambient light level.

14. The method of claim 11, further comprising:

detecting motion of the peripheral vision head-mounted display system using a motion sensor;

interpreting the motion as user input; and selecting one of a plurality of display modes of the light display element based upon the user input.

15. The method of claim 14, wherein the information is received from a signaling device, further comprising sending the user input to the signaling device.

16. The method of claim 14, wherein the motion sensor comprises one or more of an accelerometer and a gyroscope.

17. The method of claim 11, further comprising:

sensing sound from at least one microphone coupled with the peripheral vision display system; and generating the illumination pattern based upon the sound.

18. The method of claim 17, the at least one microphone comprising at least two directional microphones, wherein the microcontroller determines directionality of the sound and generates the illumination pattern to indicate the directionality.

* * * * *

UNITED STATES PATENT AND TRADEMARK OFFICE
CERTIFICATE OF CORRECTION

PATENT NO. : 9,645,396 B2
APPLICATION NO. : 13/848650
DATED : May 9, 2017
INVENTOR(S) : Ian Edward Andes et al.

Page 1 of 1

It is certified that error appears in the above-identified patent and that said Letters Patent is hereby corrected as shown below:

In the Claims

Column 35, Line 4, "a microcontroller coupled with the light display element" should read -- a microcontroller coupled with at least one light display element --;

Column 35, Line 7, "information and for controlling the light display" should read -- information and for controlling at least one light display --;

Column 35, Line 11, "to position the light display element relative to the user's" should read -- to position at least one light display element relative to the user's --;

Column 36, Line 2, "illumination pattern for the light display element based" should read -- illumination pattern for at least one light display element based --;

Column 36, Line 4, "controlling the light display element to illuminate" should read -- controlling at least one light display element to illuminate --;

Column 36, Line 28, "selecting one of a plurality of display modes of the light" should read -- selecting one of a plurality of display modes of at least one light --;

Column 36, Line 36, "sensing sound from at least one microphone coupled with" should read -- sensing sound from a head-mounted microphone coupled with --.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*